(12) United States Patent
Rozbicki et al.

(10) Patent No.: US 11,966,141 B2
(45) Date of Patent: *Apr. 23, 2024

(54) OBSCURING BUS BARS IN ELECTROCHROMIC GLASS STRUCTURES

(71) Applicant: View, Inc., Milpitas, CA (US)

(72) Inventors: Robert T. Rozbicki, Saratoga, CA (US); Gordon E. Jack, San Jose, CA (US); Disha Mehtani, Los Altos, CA (US)

(73) Assignee: View, Inc., Milpitas, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 17/178,242

(22) Filed: Feb. 17, 2021

(65) Prior Publication Data

US 2021/0200053 A1    Jul. 1, 2021

Related U.S. Application Data

(63) Continuation of application No. 15/924,099, filed on Mar. 16, 2018, now Pat. No. 10,969,644, which is a continuation of application No. 15/038,727, filed as application No. PCT/US2014/072362 on Dec. 24, 2014, now Pat. No. 9,952,481.

(60) Provisional application No. 61/920,684, filed on Dec. 24, 2013.

(51) Int. Cl.
*G02F 1/153* (2006.01)
*G02F 1/155* (2006.01)

(52) U.S. Cl.
CPC ............ *G02F 1/1533* (2013.01); *G02F 1/155* (2013.01)

(58) Field of Classification Search
CPC ........ G02F 1/1533; G02F 1/153; G02F 1/155; G02F 1/161; G02F 1/163; E06B 3/67; E06B 9/24; E06B 3/66314; E06B 2009/2464; G09G 3/38; B32B 17/068; B32B 17/10036; B32B 17/10055
See application file for complete search history.

(56) References Cited

U.S. PATENT DOCUMENTS

| 5,302,414 | A  | 4/1994  | Alkhimov et al. |
| 6,118,573 | A  | 9/2000  | Kubo et al. |
| 6,317,248 | B1 | 11/2001 | Agrawal et al. |
| 6,471,360 | B2 | 10/2002 | Rukavina et al. |
| 6,924,919 | B2 | 8/2005  | Hunia et al. |
| 6,961,168 | B2 | 11/2005 | Agrawal et al. |

(Continued)

FOREIGN PATENT DOCUMENTS

| CN | 102203370 A | 9/2011 |
| CN | 202111111 U | 1/2012 |

(Continued)

OTHER PUBLICATIONS

JP-2005509549-A, translation (Year: 2005).*

(Continued)

*Primary Examiner* — Wen Huang
(74) *Attorney, Agent, or Firm* — Weaver Austin Villeneuve & Sampson LLP; Brian D. Griedel

(57) ABSTRACT

Embodiments described include bus bars for electrochromic or other optical state changing devices. The bus bars are configured to color match and/or provide minimal optical contrast with their surrounding environment in the optical device. Such bus bars may be transparent bus bars.

30 Claims, 15 Drawing Sheets

(56) References Cited

U.S. PATENT DOCUMENTS

| | | |
|---|---|---|
| 7,133,181 B2 | 11/2006 | Greer |
| 7,586,664 B2 | 9/2009 | O'Shaughnessy et al. |
| 7,649,668 B2 | 1/2010 | Fanton et al. |
| 7,719,751 B2 | 5/2010 | Egerton et al. |
| 8,164,818 B2 | 4/2012 | Collins et al. |
| 8,213,074 B1 | 7/2012 | Shrivastava et al. |
| 8,493,646 B2 | 7/2013 | Burdis |
| 8,643,933 B2 | 2/2014 | Brown |
| 8,711,465 B2 | 4/2014 | Bhatnagar et al. |
| 9,081,247 B1 | 7/2015 | Pradhan et al. |
| 9,128,346 B2 | 9/2015 | Shrivastava et al. |
| 9,158,172 B2 | 10/2015 | Sbar et al. |
| 9,158,173 B2 | 10/2015 | Bhatnagar et al. |
| 9,442,339 B2 | 9/2016 | Parker et al. |
| 9,454,053 B2 | 9/2016 | Strong et al. |
| 9,482,922 B2 | 11/2016 | Brown et al. |
| 9,939,704 B2 | 4/2018 | Patterson et al. |
| 9,952,481 B2 | 4/2018 | Rozbicki et al. |
| 9,958,750 B2 | 5/2018 | Parker et al. |
| 10,884,311 B2 | 1/2021 | Rozbicki et al. |
| 10,969,644 B2 | 4/2021 | Rozbicki et al. |
| 11,500,259 B2 | 11/2022 | Rozbicki et al. |
| 2002/0149829 A1 | 10/2002 | Mochizuka et al. |
| 2004/0032638 A1 | 2/2004 | Tonar et al. |
| 2006/0285190 A1 | 12/2006 | Agrawal et al. |
| 2007/0047058 A1 | 3/2007 | Lim |
| 2007/0133078 A1 | 6/2007 | Fanton et al. |
| 2008/0141936 A1 | 6/2008 | Pui et al. |
| 2008/0259262 A1 | 10/2008 | Jones et al. |
| 2008/0315270 A1 | 12/2008 | Marsh et al. |
| 2009/0321728 A1 | 12/2009 | Seo |
| 2009/0322070 A1 | 12/2009 | Reichelsheimer et al. |
| 2010/0067090 A1 | 3/2010 | Egerton et al. |
| 2010/0200549 A1 | 8/2010 | Blankenship et al. |
| 2010/0245044 A1 | 9/2010 | Dietemann |
| 2011/0075244 A1 | 3/2011 | Millett et al. |
| 2011/0100709 A1 | 5/2011 | Wang et al. |
| 2011/0143045 A1* | 6/2011 | Veerasamy ............ C01B 32/194 427/510 |
| 2011/0211246 A1 | 9/2011 | Agrawal et al. |
| 2011/0255141 A1 | 10/2011 | Agrawal et al. |
| 2012/0147449 A1 | 6/2012 | Bhatnagar et al. |
| 2012/0300280 A1 | 11/2012 | Murphy et al. |
| 2012/0327499 A1 | 12/2012 | Parker et al. |
| 2013/0258436 A1 | 10/2013 | Podbelski et al. |
| 2013/0278988 A1 | 10/2013 | Jack et al. |
| 2014/0133005 A1 | 5/2014 | Sbar et al. |
| 2014/0192393 A1 | 7/2014 | Bhatnagar et al. |
| 2015/0098169 A1 | 4/2015 | Karlen et al. |
| 2016/0377948 A1 | 12/2016 | Rozbicki et al. |
| 2018/0210307 A1 | 7/2018 | Parker et al. |
| 2018/0231859 A1 | 8/2018 | Rozbicki et al. |
| 2018/0364539 A1 | 12/2018 | Rozbicki et al. |
| 2019/0079365 A1 | 3/2019 | Sarrach et al. |
| 2019/0094643 A1 | 3/2019 | Friedman et al. |
| 2020/0110321 A1 | 4/2020 | Heintzelman |
| 2021/0191216 A1 | 6/2021 | Rozbicki et al. |
| 2022/0019114 A1 | 1/2022 | Friedman et al. |
| 2022/0121076 A1 | 4/2022 | Neander et al. |
| 2023/0080293 A1 | 3/2023 | Rozbicki et al. |

FOREIGN PATENT DOCUMENTS

| | | | |
|---|---|---|---|
| CN | 102998872 | A | 3/2013 |
| CN | 103261960 | A | 8/2013 |
| CN | 103370649 | A | 10/2013 |
| CN | 103562788 | A | 2/2014 |
| CN | 103643871 | A | 3/2014 |
| CN | 104364707 | A | 2/2015 |
| CN | 104859408 | A | 8/2015 |
| CN | 104950473 | A | 9/2015 |
| JP | 2005509549 | A * | 4/2005 |
| KR | 20150089384 | A | 8/2015 |
| TW | 200501144 | A | 1/2005 |
| TW | 201809842 | A | 3/2018 |
| WO | WO1996/024882 | A1 | 8/1996 |
| WO | WO-9949447 | A1 | 9/1999 |
| WO | WO2009/020804 | A1 | 2/2009 |
| WO | WO-2009158510 | A2 | 12/2009 |
| WO | WO-2013090209 | A1 | 6/2013 |
| WO | WO2013/138535 | A1 | 9/2013 |
| WO | WO2013/163107 | | 10/2013 |
| WO | WO-2014137378 | A1 | 9/2014 |
| WO | WO2015/089663 | A1 | 6/2015 |
| WO | WO2015/100419 | A1 | 7/2015 |
| WO | WO2017/011268 | | 1/2017 |
| WO | WO2017/112685 | | 6/2017 |
| WO | WO2020/112907 | | 6/2020 |

OTHER PUBLICATIONS

US Preliminary Amendment dated Dec. 28, 2016 in U.S. Appl. No. 15/038,727.
U.S. Notice of Allowance dated Aug. 25, 2017 in U.S. Appl. No. 15/038,727.
U.S. Notice of Allowance dated Dec. 18, 2017 in U.S. Appl. No. 15/038,727.
U.S. Office Action dated Nov. 4, 2019 in U.S. Appl. No. 15/924,099.
U.S. Final Office Action dated Apr. 20, 2020 in U.S. Appl. No. 15/924,099.
U.S. Notice of Allowance dated Oct. 8, 2020 in U.S. Appl. No. 15/924,099.
U.S. Office Action dated Nov. 15, 2019 in U.S. Appl. No. 15/780,606.
U.S. Office Action dated May 29, 2020 in U.S. Appl. No. 15/780,606.
U.S. Notice of Allowance dated Oct. 15, 2020 in U.S. Appl. No. 15/780,606.
International Search Report and Written Opinion dated Apr. 1, 2015 from PCT/US2014/072362.
International Preliminary Report on Patentability dated Jul. 7, 2016 from PCT/US2014/072362.
CN Office Action dated May 19, 2017 in CN Application No. 201480067950.4.
CN Office Action dated Apr. 4, 2018 in CN Application No. 201480067950.4.
CN Office Action dated Oct. 15, 2018 in CN Application No. 201480067950.4.
EP Extended Search Report dated Aug. 17, 2017 in EP Application No. 14873490.8.
EP Office Action dated Mar. 29, 2019 in EP Application No. 14873490.8.
CN Office Action dated Nov. 2, 2020 in CN Application No. 201680078643.5, with English translation.
EP Extended Search Report dated May 29, 2019 in EP Application No. 16879981.5.
EP Office Action dated Jun. 12, 2020 in EP Application No. 16879981.5.
International Search Report and Written Opinion dated Apr. 10, 2017 from PCT/US2016/067813.
International Preliminary Report on Patentability dated Jun. 26, 2018 in PCT/US2016/067813.
International Search Report and Written Opinion (ISA/KR) dated May 24, 2017 from PCT/US2017/021408.
International Preliminary Report on Patentability dated Sep. 20, 2018 from PCT/US2017/021408.
Invitation to Pay Addidional Fees dated Mar. 11, 2020 in PCT Application No. PCT/US2019/063453.
International Search Report and Written Opinion dated Jul. 5, 2020 in PCT Application No. PCT/US2019/063453.
Tseng, C-Y et al., "Improved performance mechanism of III-V compound triple-junction solar cell using hybrid electrode structure," Solar Energy, vol. 89, Jan. 19, 2013, pp. 17-22.
CA Office Action dated Feb. 9, 2021 in CA Application No. 2,934,277.
CA Office Action dated Aug. 4, 2021 in CA Application No. 2,934,277.
CN Office Action dated May 8, 2021 in CN Application No. 201910142797.1.

(56) References Cited

OTHER PUBLICATIONS

EP Office Action dated May 26, 2021 in EP Application No. 16879981.5.
International Preliminary Report of Patentability dated May 25, 2021 in PCT Application No. PCT/US2019/063453.
CA Office Action dated Sep. 23, 2022, in Application No. CA2934277.
Chowdhury, M. et al., "Application of Thermochromic Colorants on Textiles: Temperature Dependence of Colorimetric Properties", Coloration Technology, 2013, vol. 129, pp. 232-237.
CN Office Action dated May 10, 2022, in Application No. CN201680078643.5 With English Translation.
CN Office Action dated Aug. 16, 2021, in CN Application No. 201680078643.5 with English translation.
CN Office Action dated Dec. 15, 2021, in Application No. CN201910142797.1 with English translation.
CN Office Action dated Feb. 8, 2022, in Application No. CN201680078643.5 with English Translation.
CN Office Action dated Jul. 1, 2022 in Application No. CN201910142797.1 with English translation.
CN Office Action dated Oct. 19, 2022, in Application No. CN201680078643.5.
EP Extended European Search Report dated Sep. 23, 2021, in application No. EP21162654.4.
EP Office Action dated May 20, 2022, in Application No. EP20160879981.5.
U.S. Corrected Notice of Allowance dated Aug. 10, 2022 in U.S. Appl. No. 17/100,731.
U.S. Corrected Notice of Allowance dated Oct. 6, 2022 in U.S. Appl. No. 17/100,731.
U.S. Notice of Allowance dated Jun. 29, 2022 in U.S. Appl. No. 17/100,731.
U.S. Appl. No. 17/900,886, inventors Rozbicki et al., filed on Sep. 1, 2022.
CA Office Action dated Jan. 17, 2023 in Application No. CA3009470.
European Office Action dated Mar. 29, 2023 in Application No. EP19829721.
CN Office Action dated Sep. 29, 2023, in CN Application No. 201980084984.7 with English Translation.
U.S. Corrected Notice of Allowance dated Oct. 13, 2023, in U.S. Appl. No. 17/900,886.
U.S. Notice of Allowance dated Sep. 29, 2023 in U.S. Appl. No. 17/900,886.
CA Office Action dated Nov. 15, 2023 in CA Application No. 3009470.

* cited by examiner

OBSCURING BUS BARS IN ELECTROCHROMIC GLASS STRUCTURES

CROSS-REFERENCES TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

FIELD

The embodiments disclosed herein relate generally to techniques for obscuring from view bus bars and other features within an electrochromic (EC) glass structure assembly having, for example, one or more insulated glass units (IGUs).

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. One well known electrochromic material is tungsten oxide ($WO_3$). Tungsten oxide is a cathodic electrochromic material in which a coloration transition, transparent to blue, occurs by electrochemical reduction.

Electrochromic materials may be incorporated into, for example, windows for home, commercial and other uses. The color, transmittance, absorbance, and/or reflectance of such windows may be changed by inducing a change in the electrochromic material, that is, electrochromic windows are windows that can be darkened or lightened electronically. A small voltage applied to an electrochromic device of the window will cause them to darken; reversing the voltage causes them to lighten. This capability allows control of the amount of light that passes through the windows, and presents an opportunity for electrochromic windows to be used as energy-saving devices.

While electrochromism was discovered in the 1960s, electrochromic devices, and particularly electrochromic windows, still unfortunately suffer various problems and have not begun to realize their full commercial potential despite many recent advances in electrochromic technology, apparatus and related methods of making and/or using electrochromic devices.

BRIEF SUMMARY

Certain embodiments described herein generally relate to techniques for obscuring bus bars in electrochromic glass structures.

Certain embodiments pertain to an insulated glass unit (IGU) comprising first and second substantially transparent substrates, a spacer between the first and second substantially transparent substrates, a primary seal, an electrochromic device, and a bus bar associated with the electrochromic device. The primary seal is between the spacer and the first substantially transparent substrate and between the spacer and the second substantially transparent substrate. The electrochromic device is on at least one of the first and second substantially transparent substrates. The bus bar is associated with the electrochromic device and located in the primary seal, the bus bar camouflaged to blend in with its background. In some cases, camouflaged can mean having minimal optical contrast between the bus bar and the primary seal and/or spacer. In one case, the bus bar is made of an electrically conductive material comprising a tinting agent configured to approximate the color and luminescence of the bus bar to its background.

Certain embodiments pertain to an electrochromic glass structure comprising a substantially transparent substrate, an electrochromic device disposed on the substantially transparent substrate. The electrochromic device has one or more transparent conductive layers. The electrochromic glass structure further comprises a bus bar configured to power the electrochromic device and an opaque obscuring layer between the one or more transparent conductive layers and the substantially transparent substrate in a region proximal the bus bar. In some cases, the opaque obscuring layer is located in a region between the bus bar and the substantially transparent substrate. In some cases, the opaque obscuring layer has at least a width configured to block view of the bus bar from an observer outside the electrochromic glass structure. In some cases, the bus bar is made of a material with a color and luminescence configured to blend in with background. In one case, the bus bar material comprises one or more of carbon black, graphite, graphite-based materials, graphene, or graphene-based materials.

Certain embodiments pertain to an IGU comprising a first pane having a first substantially transparent substrate, an electrochromic device disposed on the second substantially transparent substrate, the electrochromic device comprising a first transparent conductive layer proximal the second substantially transparent substrate, an electrochromic stack, and a second transparent conductive layer. The IGU further comprises a second pane having a second substantially transparent substrate, a spacer between the first and second panes, a primary sealant adhering the spacer to the first and second panes, and a pair of bus bars on the first transparent conductive layer, nearest the first pane, and one or more transparent bus bars on the second transparent conductive layer. The pair of bus bars is located between the spacer and the first substantially transparent substrate such that the spacer blocks view of the pair of bus bars from an observer viewing through the second pane. In some cases, the pair of bus bars is made of materials configured to match color and luminescence to the spacer and/or the primary sealant. In some cases, the one or more transparent bus bars are in the viewable region of the IGU. In one case, the additional one or more transparent bus bars are patterned onto the first substantially transparent substrate and then the first transparent conductor layer is fabricated thereon. In one case, the additional one or more transparent bus bars are embedded in the first substantially transparent substrate in at least in the viewable region of the IGU.

Certain embodiments pertain to an IGU or laminate comprising an electrochromic device on at least one transparent substrate, of at least two transparent substrates of the IGU or laminate and at least one transparent bus bar configured to electrically power the electrochromic device. In some cases, the transparent bus bar comprises a transparent conductive material embedded with conductive particles. In some cases, the conductive particles are nanoparticles. In some cases, the at least one transparent bus bar is a thin layer of metal or metal alloy. In one example, the thin layer of metal or metal alloy is between about 1 nm and about 10 nm thick. In another example, the thin layer of metal or metal alloy is less than about 5 nm thick.

These and other features are described in more detail below with reference to the associated drawings.

DETAILED DESCRIPTION

Figure 1A:
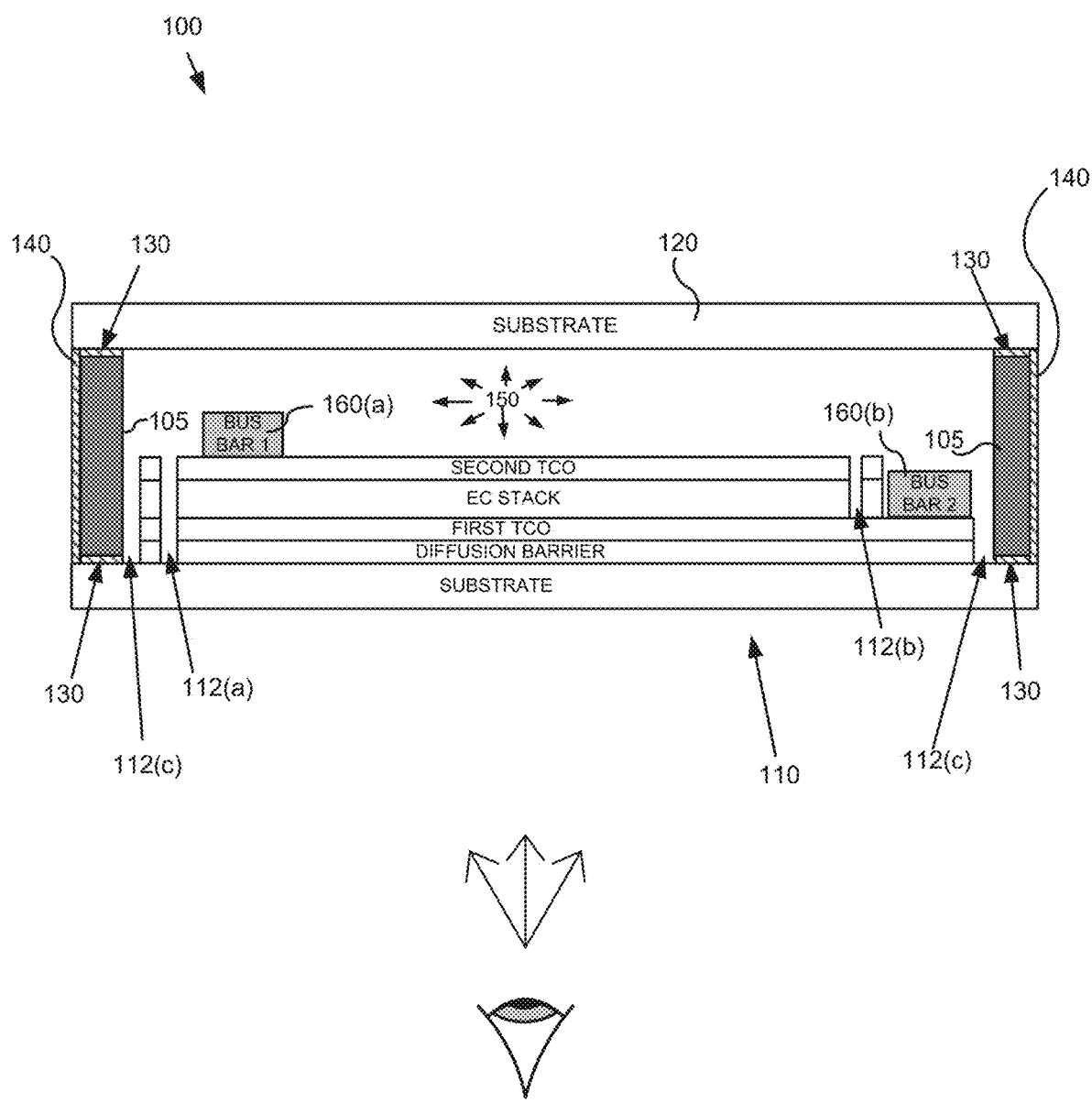
FIG. 1A is a schematic drawing of a cross section of an insulated glass unit (IGU) of an electrochromic window assembly.

In the following description, numerous specific details are set forth in order to provide a thorough understanding of the presented embodiments. The disclosed embodiments may be practiced without some or all of these specific details. In other instances, well-known process operations have not been described in detail to not unnecessarily obscure the disclosed embodiments. While the disclosed embodiments will be described in conjunction with the specific embodiments, it will be understood that it is not intended to limit the disclosed embodiments.

An electrochromic (EC) glass structure can refer to a structure including one or more EC panes (also referred to herein as EC lites) such as, for example, an insulated glass unit (IGU) or an EC pane laminated to another pane, EC or not. An example of an EC glass structure assembly is an EC window assembly having one or more IGUs. Each IGU is manufactured from two or more panes where at least one of the panes is an EC pane. Each of the EC pane and/or mate lite of an IGU may be alone or laminated to another pane for strength. The EC pane comprises a substantially transparent substrate (e.g., glass substrate) and an EC device fabricated on the substrate. Methods of fabricating EC panes, laminates and IGUs can be found in U.S. patent application Ser. No. 13/456,056 titled "ELECTROCHROMIC WINDOW FABRICATION METHODS," filed on Apr. 25, 2012, which is hereby incorporated by reference in its entirety. In these fabrication methods, EC panes with fully assembled EC devices are fabricated first, and then IGUs are manufactured using one or more of the EC panes. Typically, an IGU is formed by placing a sealing separator, for example, a gasket or seal (for example made of PVB (polyvinyl butyral), PIB or other suitable elastomer) around the perimeter of the substrate. In some embodiments, the sealing separator includes a metal, or other rigid material, spacer and sealant between the spacer and each substrate. After the panes are sealed to the spacer, a secondary seal is provided around the outer perimeter of the spacer, for example a polymeric material, e.g. a silicone-based material that resists water and that adds structural support to the assembly. In some cases, a desiccant may be included in the IGU frame or spacer during assembly to absorb any moisture. In one case, the sealing separator surrounds the bus bars and electrical leads to the bus bars extend through the seal. Typically, but not necessarily, the IGU is filled with inert gas such as argon. The completed IGU can be installed in, for example, a frame or wall and connected to a power source (or wirelessly powered) and a controller to control power to transition the optical states of the EC device(s). Examples of bus bars and spacers can be found in U.S. patent application Ser. No. 13/312,057 titled "SPACERS FOR INSULATED GLASS UNITS" and filed on Dec. 6, 2011 and U.S. patent application Ser. No. 13/452,032 titled "ANGLED BUS BAR" and filed on Apr. 20, 2012, which are hereby incorporated by reference in their entirety.

In a conventional EC glass structure assembly, especially on larger size substrates, manufacturers use a bus bar and/or scribe lines in the viewable area of the IGU, e.g. due to engineering or perceived need to do so. This has traditionally been aesthetically unpleasing due to the contrast between the EC device and the scribe line and/or bus bar in the viewable area.

For example, referring to FIG. 1A, which shows a conventional electrochromic IGU, 100, and an observer viewing the IGU (as depicted with the stylized eye) that might be able to see both bus bars and other features when the EC coating is darkened or in the clear state. FIG. 1A is a schematic drawing of a cross section of an IGU 100 of an EC IGU 100. In FIG. 1A, a spacer, 105, is used to separate a first EC pane 110 from a second pane 220. The first EC pane includes an EC device fabricated on a substantially transparent substrate such as a glass substrate. The second pane 220 in this example is a non-EC pane. In other examples, second pane 220 can have an EC device thereon and/or one or more coatings such as low-E coatings and the like. Between spacer 105 and, in this example, the substrate of first EC pane 110 is a primary seal, 130. This primary seal 130 is also between spacer 105 and the second non-EC pane 220. Around the perimeter of spacer 105 is a secondary seal, 140 (bus bar wiring may traverse the primary seal for connection to controller). These seals aid in keeping moisture out of the interior space, 150, of IGU 100.

In FIG. 1A, areas 112(*a*) and 112 (*b*) represent where the EC device stack has been removed (e.g., by laser scribing), in this example, at a perimeter region. In this example, the area 112(*a*) passes through the second transparent conducting oxide (TCO), the EC stack and the first TCO, and may be able to isolate the operable EC device from other portions of the EC device that were potentially damaged during edge deletion. In certain cases, the EC stack comprises an EC layer, a counter electrode (CE) layer, and an optional discrete ion conducting (IC) layer. Area 112(*b*) also passes through the second TCO and the device stack, but not the bottom first TCO, as this serves as the lower conductor in electrical communication with bus bar 2. Regardless, areas 112(*a*) and 112 (*b*) allow light to pass through the glass, even though the EC device layers may be darkened. In this example, the EC stack, the first TCO and the diffusion barrier were removed in the edge deletion areas, and the outer perimeter of the EC device does not pass under the spacer into the primary seal, thus areas 112(*c*) will also allow light to pass through even when the EC device is darkened, because they have no EC coating.

Figure 1B:
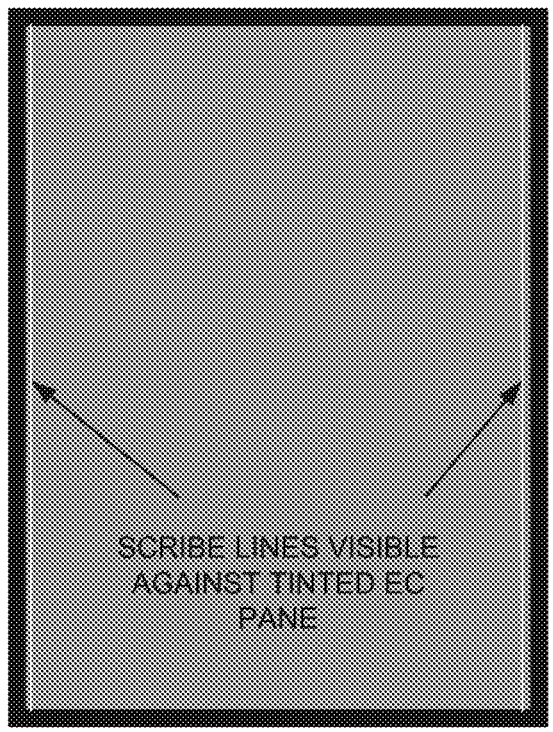
FIG. 1B is a schematic drawing of plan views of the IGU in an un-tinted state (left hand side illustration) and a tinted state (right hand side illustration) from the perspective of the observer shown by the illustrated eye in FIG. 1A.
Figure 1B:
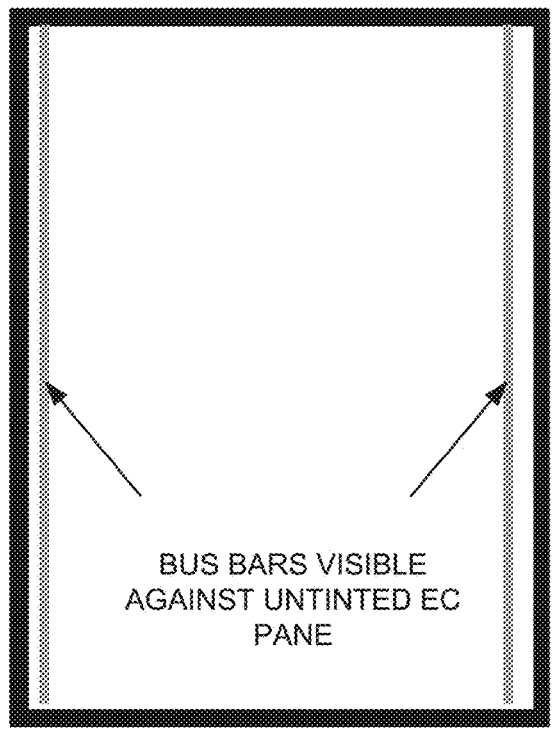

In FIG. 1A, bus bar 1 160(*a*) is fabricated on the second TCO of the EC stack and bus bar 2 160(*b*) is fabricated on the first TCO. The illustrated eye shows the perspective of an observer viewing the IGU 100 from the outside. FIG. 1B shows plan views of IGU 100 in an un-tinted state (left hand side illustration) and a tinted state (right hand side illustration) from the perspective of the observer shown by the illustrated eye in FIG. 1A. As shown, unless the techniques for obscuring of certain embodiments are used, the bus bars and/or the scribe lines in IGU 100 are visible in contrast with its background of the EC device (tinted and untinted) and/or the surrounding spacer. In the tinted state, the scribe lines are visible against the first EC pane 110 in the tinted state. Although not shown, the bus bar bus bar 1 160(*a*) and bus bar 2 160(*b*) may also be partially visible in the tinted state. In the untinted state, bus bar bus bar 1 160(*a*) and bus bar 2 160(*b*) are visible. The issues related to visibility of bus bars and scribe lines in relation to conventional IGUs are addressed by embodiments described herein, but also, even with improved IGUs, where no bus bars or scribe lines are in the viewable area, there may be issues related to the type of glazing into which IGUs are incorporated.

Figure 2A:
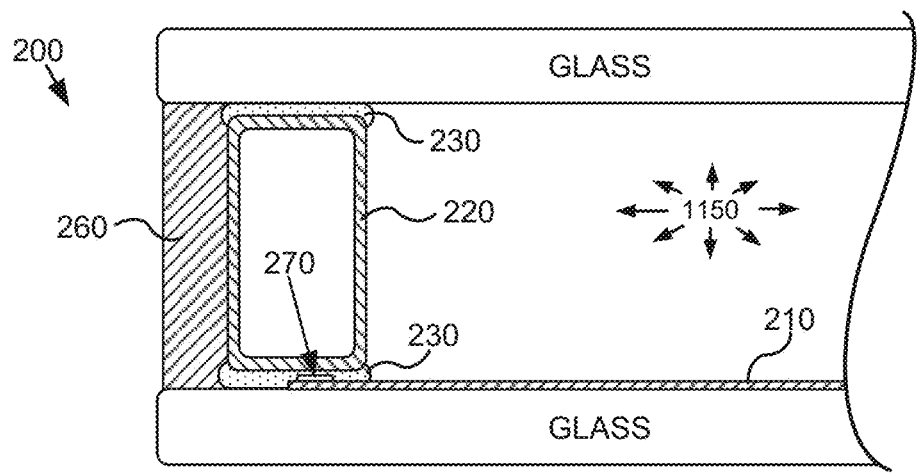
FIGS. 2A and 2B depict an electrochromic IGU configuration, according to embodiments.
Figure 2B:
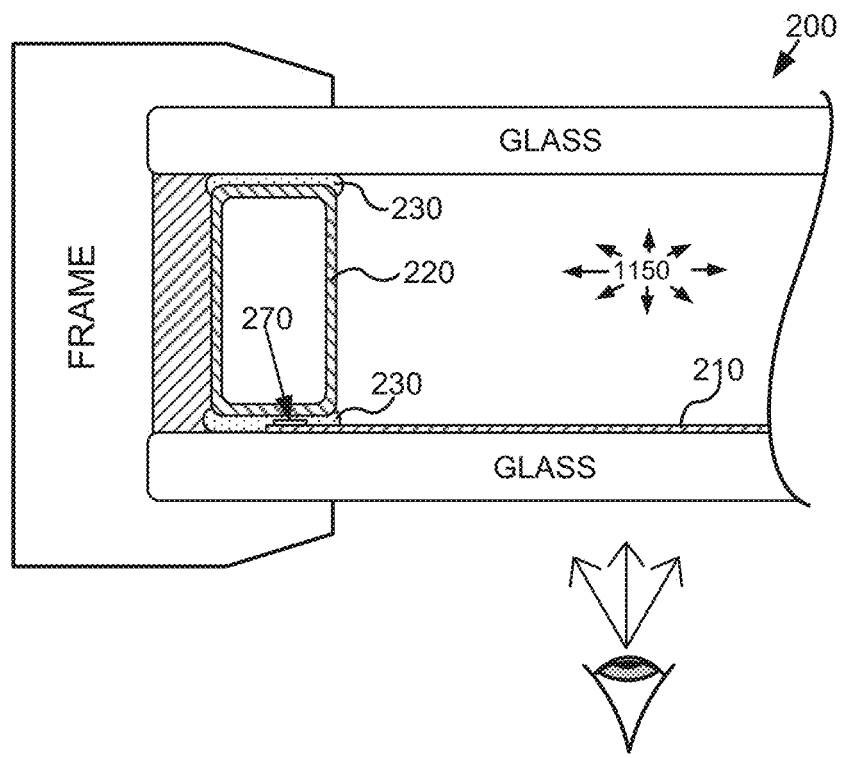

Improved IGUs, for example, as described in U.S. patent application Ser. No. 13/456,056, are configured with bus bars under the spacer, i.e. in the primary seal, of the IGU (similarly, IGUs may have the bus bar in the secondary seal area). This is illustrated in FIG. 2A. In FIG. 2A, a partial cross-section of an EC IGU 200, bus bar 270 is embedded in the primary seal 230 of the IGU 200; that is, the bus bar is sandwiched between the glass substrate and the spacer 220. Though there should be insulating primary sealant 230 between the bus bar and the spacer, in order to avoid electrical shorting between the bus bar and spacer, an electrically insulated spacer, e.g. polymeric (e.g. foam) or metal coated with an insulating material (e.g. color matched to the sealant, e.g. gray or black insulating material), is used. In the illustrated example, bus bar 270 is lying on the EC device 210 disposed on a substrate. Thus when such IGUs are installed in a frame, there are no bus bars visible to the end user, because they are not in the viewable area, see FIG. 2B; i.e. the frame blocks a line of sight to the bus bars. Still, if such IGUs are glazed using a butt joint without flashing or other material covering the periphery of the IGU as a frame would otherwise do, an observer viewing the assembly from the outside will see bus bar 270 or other uncoated regions within the assembly through the glass as in the primary seal 230 or secondary seal 260, since the EC coating is transparent. Since bus bars are typically fabricated from a metallic material such as silver ink, they usually have a metallic color such as silver or copper. These metallic-colored bus bars can be visible when seen in contrast with the rest of the assembly. It is undesirable from an aesthetic standpoint to be able to see these bus bars and other uncoated regions (e.g., scribe lines) within the assembly.

Figure 3A:
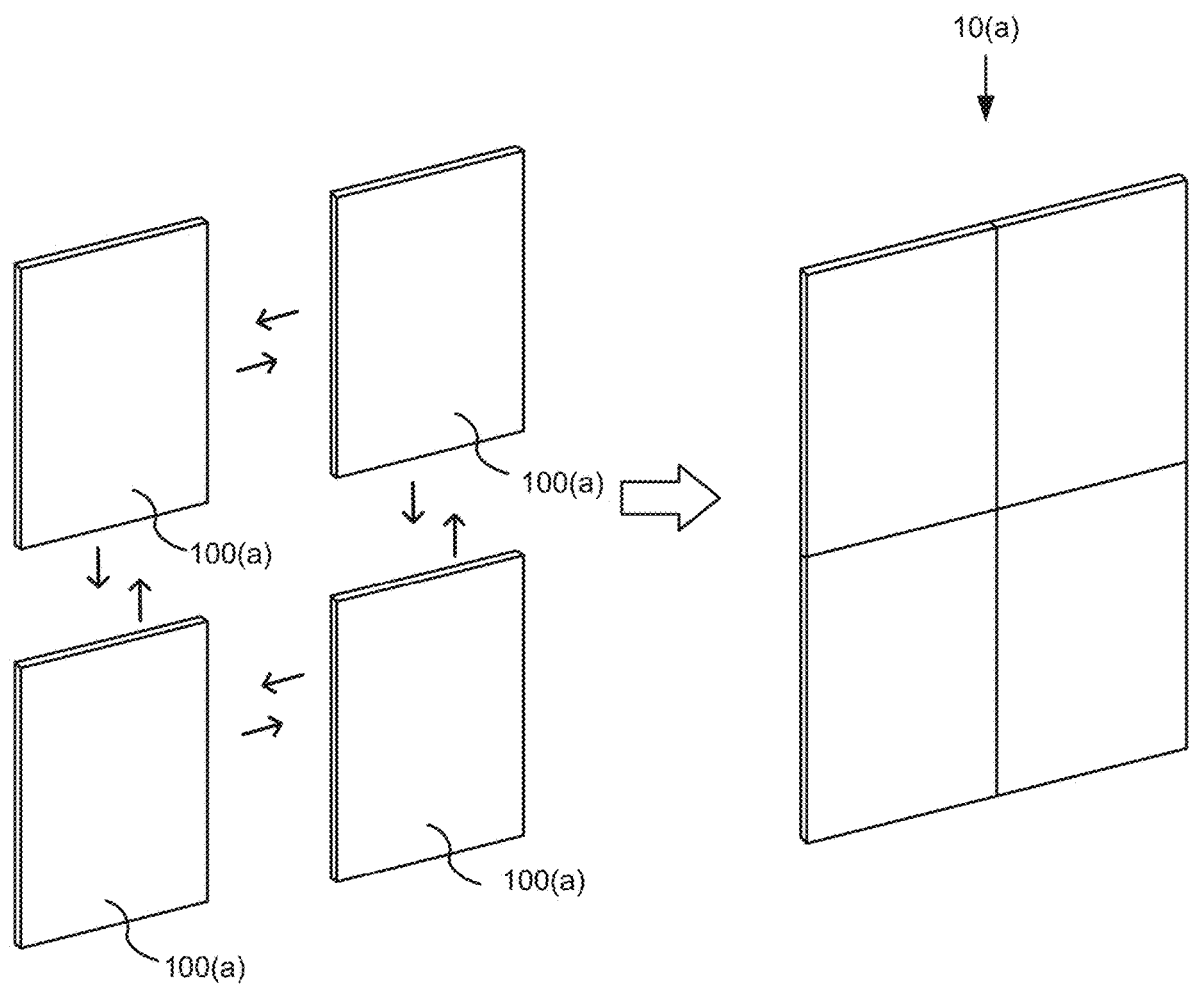
FIG. 3A is a schematic illustration of an electrochromic window assembly with butt joints between the four IGUs butted together, according to embodiments.
Figure 3B:
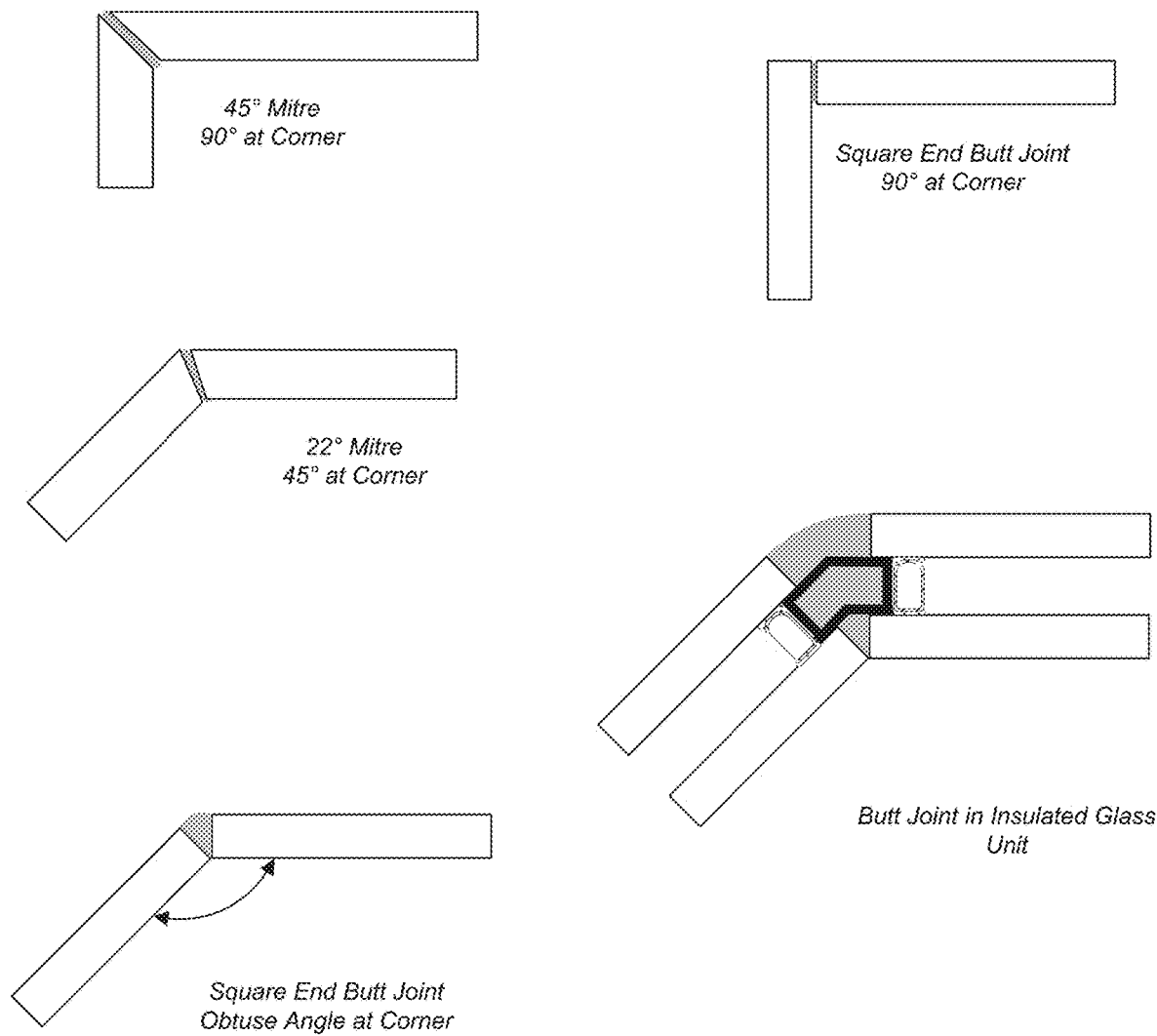
FIG. 3B are side views of different butt joint configurations, according to embodiments.

For example, an observer viewing a butt joint between adjacent IGUs of an EC window assembly might be able to view conventional metallic bus bars within the assembly. FIG. 3A is a schematic drawing of an EC window assembly 10(*a*) having butt joints between four (4) IGUs 100(*a*) butted together. Butt joints are used in window structures to increase the visible area by combining EC glass structures (e.g., IGUs) with little or no extra framing added. Electrochromic window assemblies that have a butt joint generally have one or more structural member between the EC glass structures butted together that provide support at the joint. In the case of butted IGUs, for example, a structural member may provide support between the panes of the butted IGUs, at least partially in the secondary seal area of each IGU. In FIG. 3A, the EC window assembly 10(*a*) includes butt joints without framing (or flashing) exterior to the panes on either side. Although the illustrated embodiment shows adjacent IGUs butted together at a 180 angle, butt joints that provide a corner such as, for example, 45 degrees, 165 degrees, 90 degrees, etc. may also be used. In certain cases, mitering may also be used at a butt joint having a corner. FIG. 3B are side cross-sectional views of different possible butt joint configurations of embodiments. The illustrated butt joints may be silicone butt joints in one example. In these configurations, the bus bar is visible from the outside looking in (because the EC pane is typically mounted on the outer pane of an IGU), and this is an undesirable result.

Figure 3C:
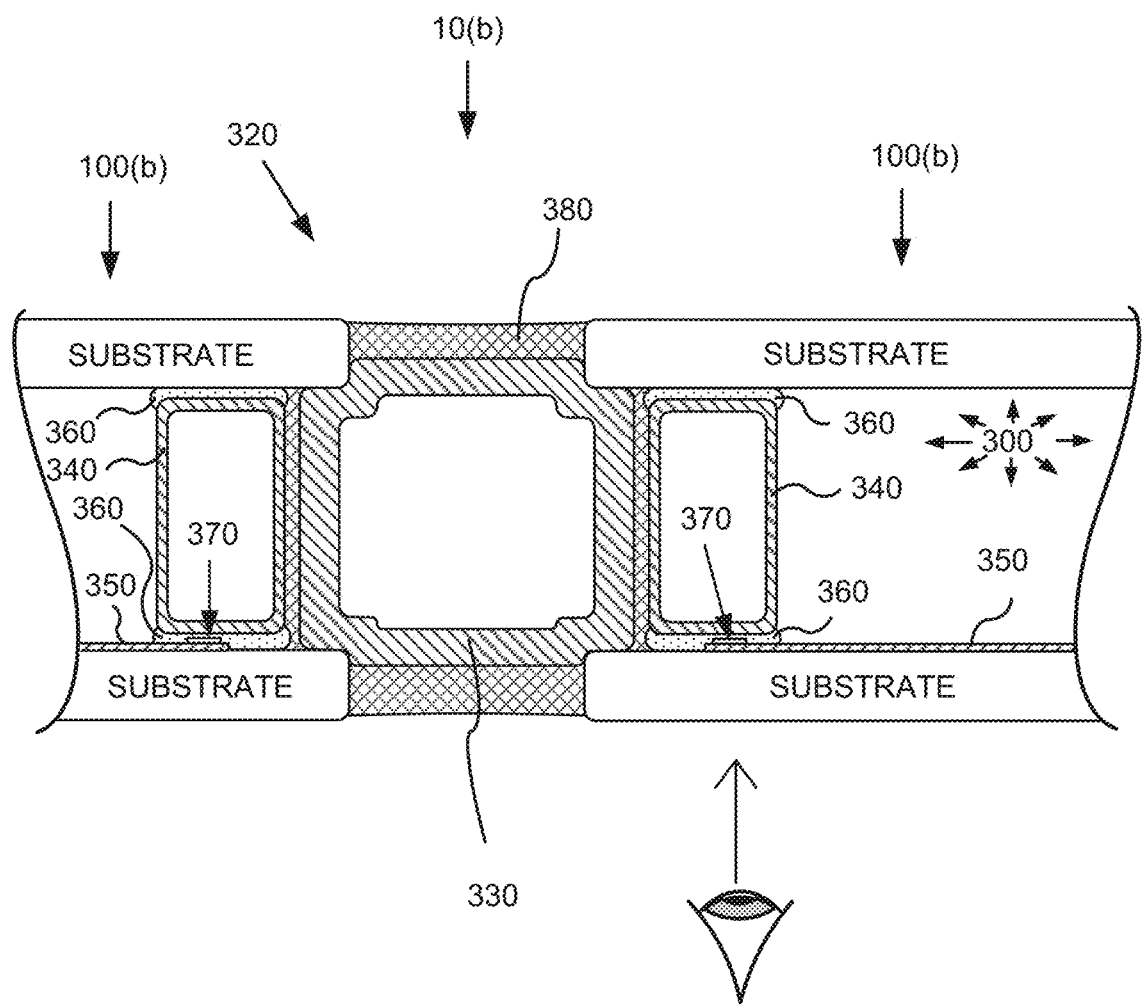
FIG. 3C is a schematic illustration of a cross sectional view of a portion of an electrochromic window assembly including a butt joint between two IGUs butted together, according to embodiments.

FIG. 3C is a schematic drawing of a cross-sectional view of a portion of an EC window assembly 10(*b*) including a butt joint 320 between two IGUs 100(*b*) butted together. The butt joint 320 in FIG. 3C may be an example of a structure that is used to join the abutted IGUs 100(*a*) in FIG. 3A. In FIG. 3C, each IGU 100(*b*) includes two panes, each pane comprising a substantially transparent substrate (e.g., glass or polymer substrate). For each IGU 100(*b*), one of the substrates includes an EC device 350 on a portion of the inner surface. In other embodiments, both substrates may have EC devices 350 and/or the EC devices 350 may be on different surfaces of the substrates.

In FIG. 3C, the butt joint 320 includes a structural member 330 having a generally rectangular cross-sectional shape. The structural member 330 have opposing vertical and horizontal legs that provide structural support by locating structural member 330 between the opposing panes, at last partially in the secondary seal area of the adjoining IGUs. Depressions along the four corner edges of the structural member 330 are configured to interface with the panes of the IGUs. Although not shown, wires for electrical connectivity between the EC devices 350 and other elements may run in the center volume of the structural member 330.

In FIG. 3C, there is at least some secondary sealant 380 (e.g., black silicone) between the structural member 330 and each spacer 340 and primary seal 360. The IGUs 100(*b*) have an interior space 300, which may be filled with an inert gas such as argon and pressurized. In this example, there is no framing or flashing used that extends outside of the exterior surfaces of the substrates, there is only secondary sealant 380 between substrate edges. Bus bars 370 for powering the EC devices 350 are located between the spacer 340 and the edge of the EC devices 350. The illustrated eye shows the perspective of an observer viewing the EC window assembly 10(b) from the outside. As illustrated, the observer can view, through the glass, bus bar 370 under the spacer 340 unless the techniques for obscuring bus bars of certain embodiments described herein are used. There is no frame, flashing or other material to block the end user's line of site, the bus bars are obvious and visually distracting. As depicted, the observer can view the bus bar or uncoated region through the proximal pane when viewing the IGU 100(b) from the outside.

Embodiments disclosed herein relate generally to techniques for obscuring from view bus bars and other features within an EC glass structure assembly. Some examples of these techniques are described below, in some cases with reference to the Figures. For example, certain embodiments are directed to camouflaging visible features to blend in with their background. As another example, certain embodiments are directed to adding an obscuring layer between the visible feature and the observer to obscure it from view. In another example, certain embodiments are directed to transparent or substantially transparent features.

A. Camouflaging Techniques

In certain embodiments, camouflaging techniques may be used to make the bus bar or other visible feature in the EC window assembly the same or similar color as the "background." "Background" can refer to the element or elements of the EC window assembly that are visible from the outside of the assembly and are from the viewpoint of the observer behind the feature being camouflaged. In many cases, the "background" to a bus bar is the spacer or sealant in a primary seal of an IGU. In FIG. 3C, for example, the background to the bus bars 370 is the sealant 360. Black and gray are common background colors, although other colors may apply. The goal of camouflaging techniques is to reduce the contrast between the bus bar or other visible feature and the background (e.g., sealant and/or spacer).

Contrast can refer to the difference in color (hue) and/or brightness (luminance) between the foreground feature being camouflaged and its background. One metric of the differences in brightness is a luminance contrast ratio between the measured luminance of the background and measured luminance of the feature being camouflaged. Examples of different luminance contrast ratios that can be used include Weber contrast ($C_W=(L_f-L_b)/L_b$), Michelson contrast ($C_{mich}=(L_{max}-L_{min})/(L_{max}+L_{min})$), Luminance ratio ($C_R=L_f/L_b$), and RMS contrast, where $L_f$ is the measured luminance of the feature and $L_b$ is the measured luminance of the background. One metric of a difference in color contrast is the Delta E (or ΔF) developed by the International Commission on Illumination (CIE). Other measurements of color contrast may also be used such as CIE76, CIE94, CIEDE2000, etc.

In certain embodiments, a tinting agent can be added to the material used to fabricate the bus bar to mask its normal color and brightness and make it the same or similar to the background. Since black is a common background color, carbon black, or graphite may be used as a tinting agent in some cases. In certain cases, the tinting agent and/or the amount of tinting agent is selected based on measured luminance contrast ratio and measured color contrast (e.g., measured Delta E) between the final color of the bus bar and the background. In one case, the tinting agent and/or amount of tinting agent is selected to be within a range of acceptable contrast values.

In some embodiments, bus bars may be fabricated from non-conventional bus bar materials that have the same color or similar color to the background and are also electrically conductive such as, for example, certain carbon-based materials. Some examples of suitable carbon-based materials include materials having carbon black, graphite, graphite-based materials, graphene, graphene-based materials, etc. These materials have been shown to have excellent electrical conductivity and may be processed to fabricate conductive strips or similar structures suitable for bus bars.

In other embodiments, the features in the background of the bus bar may be fabricated to have the same or similar color as the bus bar (or other visible feature being camouflaged). For example, tinting agents may be added to the sealant or a coating applied over the sealant to make the sealant the same or similar color as the feature being camouflaging.

B. Intervening Obscuring Layer from View Techniques

In certain embodiments, techniques may be used to form an opaque obscuring layer between the bus bar and an observer to block the view of the bus bar from the observer. In certain cases, the obscuring layer is made of a material having a color that is the same or similar to the background. A tinting agent may be used in the opaque obscuring layer. The obscuring layer has at least a width needed to prevent an observer from viewing the bus bar being obscured from a range of viewing angles or from all possible viewing angles (i.e. vantage points). For example, the obscuring layer has a width that is at least the width of the bus bar. In these embodiments, there will be at least one TCO layer between the bus bar and the obscuring layer.

In one embodiment, a tinted coating can be applied between the bus bar and the EC coating's top TCO to mask its normal color and make it the same or similar to the background color. The tinted coating may have a tinting agent as discussed above. Similarly, the color of the tinted coating may be selected so that the contrast between the tinted coating and the background has a luminance contrast ratio and/or color contrast within a range of acceptable values. Preferably the tinted coating is electrically conductive, e.g. if it covers the entire area that the bus bar occupies on the EC coating.

Figure 4:
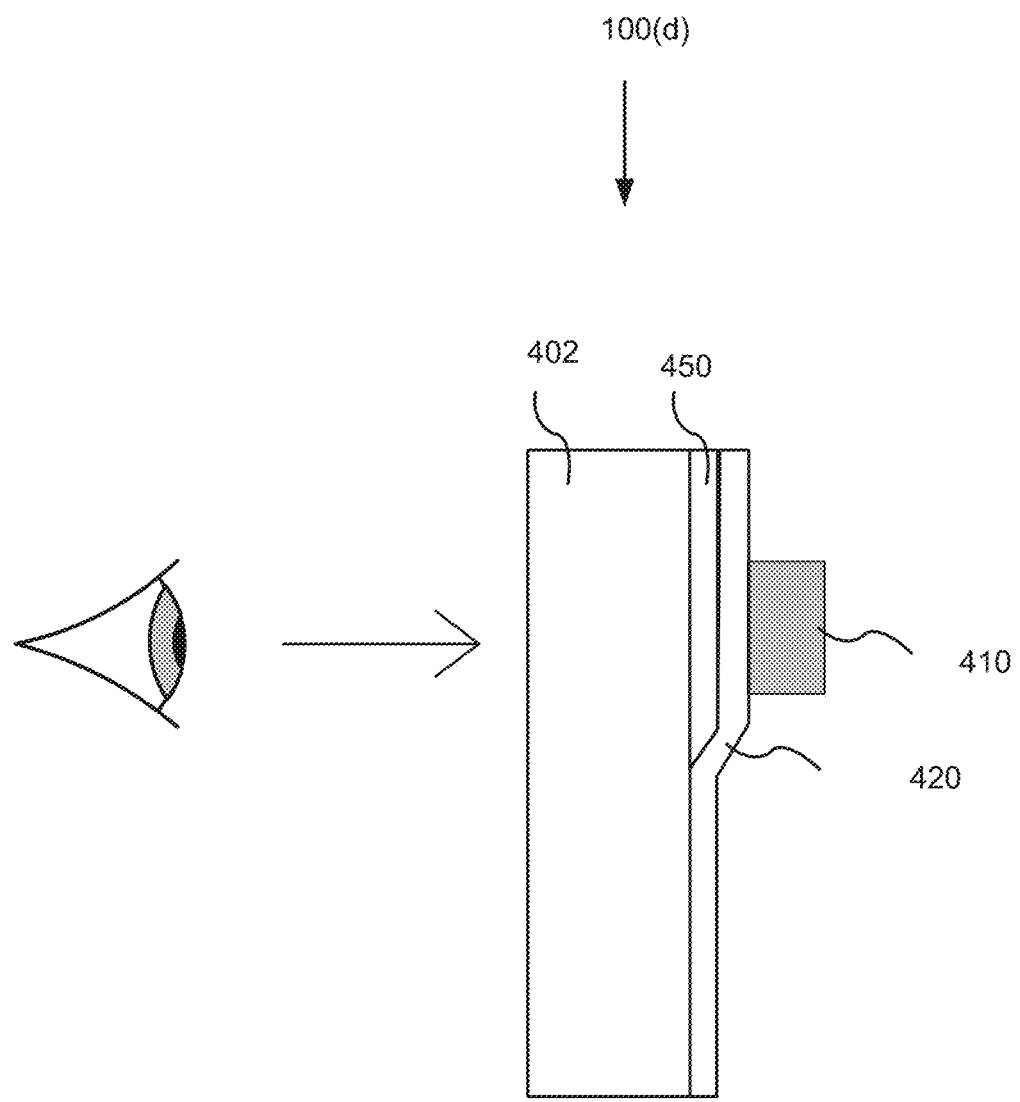
FIG. 4 is a schematic drawing of a portion of an electrochromic pane having an opaque obscuring layer, according to embodiments.

In another embodiment, a tinted coating is applied between the EC coating and the transparent substrate. FIG. 4 is a schematic drawing of a portion of an EC pane 100(d) having an opaque obscuring layer 450, according to embodiments. The illustrated eye shows the perspective of an observer viewing the EC pane 100(d) from the outside. In the illustrated example, the single pane includes a substantially transparent substrate 402 having one or more layers of an EC device 420. These layers include one or two TCO layers. The bus bar 410 is formed on the one or more layers of the EC device 420. The opaque obscuring layer is formed between the one or more layers of the EC device 420 and the substantially transparent substrate 402 in a region adjacent the bus bar 410. As illustrated, the observer is blocked from being able to view the bus bar 310 by the obscuring layer 450. Obscuring layer 450 is depicted as being approximately as thick as coating 420, but this is not necessary. Layer 450 may be much thinner. For example, a typical EC device coating may be on the order of 1 micron thick; while the obscuring layer can be between about 1 nm and 500 nm thick; between about 1 nm and about 100 nm thick; between about 1 nm and about 50 nm thick; or between about 1 nm and about 10 nm thick. The obscuration layer may be sputter deposited, e.g. a metal oxide, metal, or other material. The obscuration layer may be selectively applied, e.g. in the desired areas, or e.g. applied across the entire glass surface and selectively removed from areas where it is not desired. In the latter example, plasma or laser may be used to remove the obscuration layer material from the substrate.

Referring back to FIG. 3C, bus bar 370 can be blocked from view with an opaque obscuring layer located between the bus bar 370 and one or both of the TCOs in the EC device 350 or between the EC device 350 and the substantially transparent substrate. The width of the obscuring layer is at least the width of the bus bar 370. In this example, the obscuring layer may be made of material having the same or similar color to sealant 360 that is background to the bus bar 370.

Referring back to FIG. 1A, bus bar 1 160(*a*) can be blocked from view with an opaque obscuring layer located between the first TCO and the diffusion barrier or between the diffusion barrier and the substrate under bus bar 2 160(*b*). Bus bar 2 160(*b*) can be blocked from view with an opaque obscuring layer located outside the second TCO under bus bar 1 160(*a*).

C. Transparent or Otherwise Optically Unobtrusive Bus Bars and Other Transparent Features In certain embodiments, obscuring techniques include fabricating and using a transparent, substantially transparent bus bar, or otherwise optically unobtrusive bar. In these cases, the bus bar will not be visibly discernible and/or visually distracting to an observer. An observer viewing the general area of the bus bar will see through the bus bar and to any background (primary sealant and/or spacer) behind the bus bar or in the case of a transparent bus bar in the viewable area, will see through bus bar in the viewable area.

For example, if the bus bar 370 shown in FIG. 3C were fabricated to be transparent or substantially transparent, the observer from the vantage point of the illustrated eye outside the EC glass structure would view the sealant 360 when the EC device 350 is in the untinted state (or tinted but still allowing some light to pass through). As another example, if bus bar 1 160(*a*) shown in FIG. 1A is fabricated to be transparent or substantially transparent according to an embodiment, the observer from the vantage point of the illustrated eye would view through the bus bar in the visible area of the IGU, thus avoiding a visually distracting, high contrast bus bar.

According to certain embodiments, a transparent or substantially transparent bus bar may be fabricated from a transparent or substantially transparent material having electrically conductive properties. For example, the transparent or substantially transparent bus bar may be made from an ITO or other TCO doped with an electronically conductive agent such as conductive nanowires or other conductive nanostructure. Although the dopant may introduce haze, the bus bar will be far less visible than a conventional bus bar. In certain cases, any haze that may be introduced will not be a problem since the bus bar will be viewed in contrast to its background (e.g., sealant). In these cases, the contrast between the bus bar and the background will be minimal and may not be discernable by an observer from outside the EC glass structure. In certain cases, the transparent bus bar may be fabricated by screen printing a transparent or translucent ink containing metal nanoparticles, or by using masks during sputtering to produce a thicker region of the TCO that serves as the transparent bus bar. Also, low-haze metal doped transparent conductor materials are described in the current literature. These low-haze materials can be used for transparent bus bars.

Optically Unobtrusive Bus Bars within Viewable Region

In certain embodiments, one or more transparent or substantially transparent or otherwise optically unobtrusive bus bars may be applied to an EC lite within the viewable region of the EC window. The viewable region can refer to the area of the EC window where an observer can generally see through the window unless the EC device(s) is tinted. Generally, the viewable region is defined by the region of the EC window having a perimeter defined by the inner perimeter of the IGU spacer and/or the inner perimeter of a frame. One advantage of using bus bars in the viewable region is to improve switching uniformity and increase speed of transition between optical states. These advantages may be more significant as EC lites and their associated windows are scaled up in size as techniques for manufacturing EC coatings become more sophisticated.

In some cases, the transparent or substantially transparent or otherwise optically unobtrusive bus bars may be made of material selected such that the refractive index of the entire EC device stack and the optically unobtrusive bus bar less visibly distracting. In these cases, the material of the bus bar may be selected for a refractive index to tune the material properties of the bus bar and EC stack to make the bus bar less distinctive visually. For example, the material of the bus bar and/or other material layers of the EC stack may be selected to avoid an interference pattern. For example, the transparent bus bar may have a refractive index that approximates the TCO upon which it rests or the glass substrate, e.g. the transparent bus bar has a refractive index of between about 1.3 and about 2.0.

In some cases, the transparent or substantially transparent or otherwise optically unobtrusive bus bars may be made of a conductive and/or substantially transparent material. In some cases, these bus bars may be made of a thin layer of metal or metal alloy. In one example, the bus bar may be a thickness in the range of 1 nm and 10 nm. In one example, the bus bar has a thickness of less than about 3 nm. In another example, the bus bar has a thickness of less than about 5 nm. In other embodiments, the optically unobstrusive bus bars may be made of a non-metallic and conductive material. In certain cases, the optically unobstrusive bus bars may be made of silver nanowires or conductive carbon nanotubes (CNT) in a binding paste (i.e. CNT or silver nanowire based pastes).

Figure 5A:
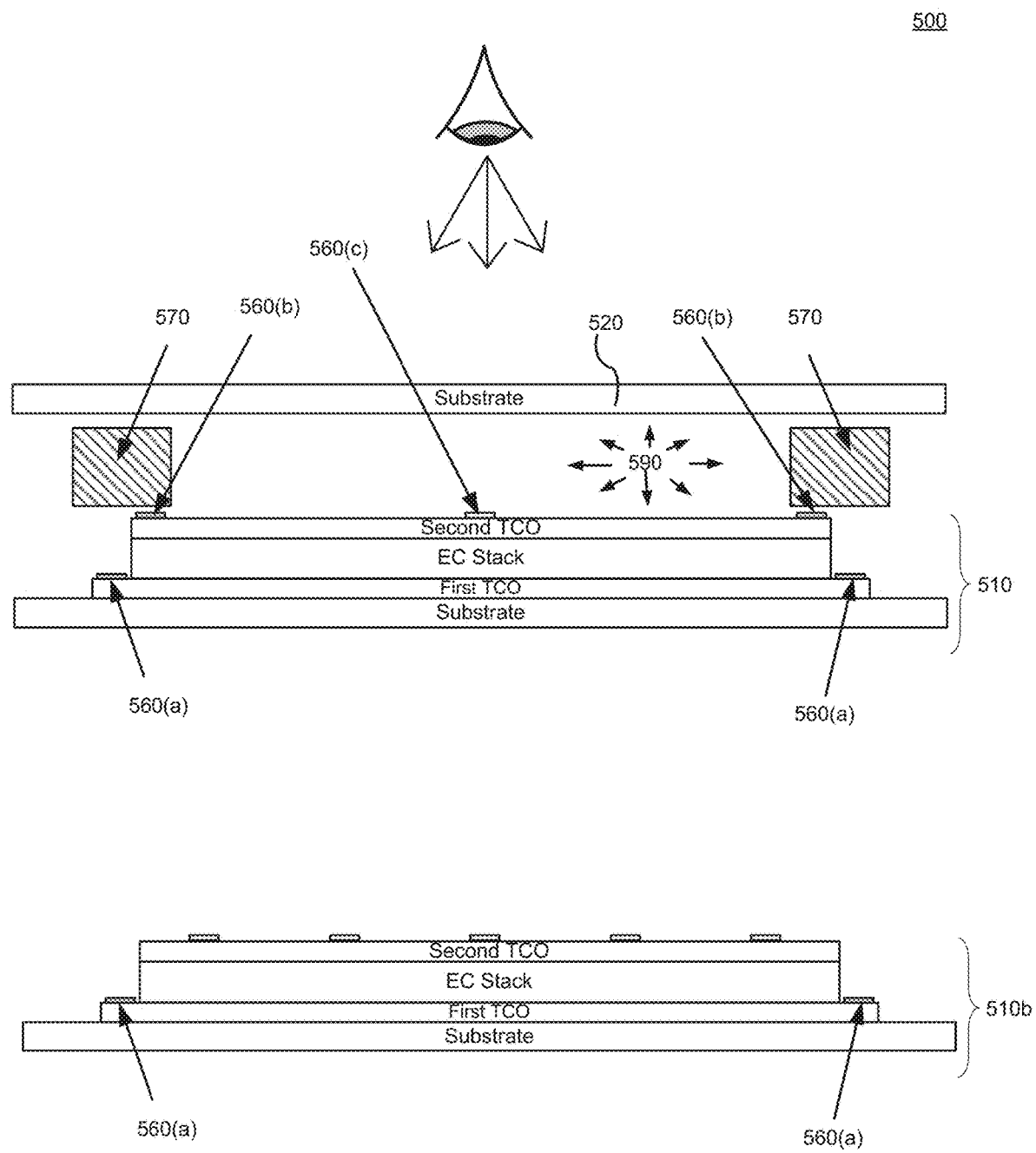
FIG. 5A is a drawing of a cross-sectional view of an EC IGU comprising an optically unobtrusive bus bar within the viewable region, according to an embodiment.
Figure 5B:
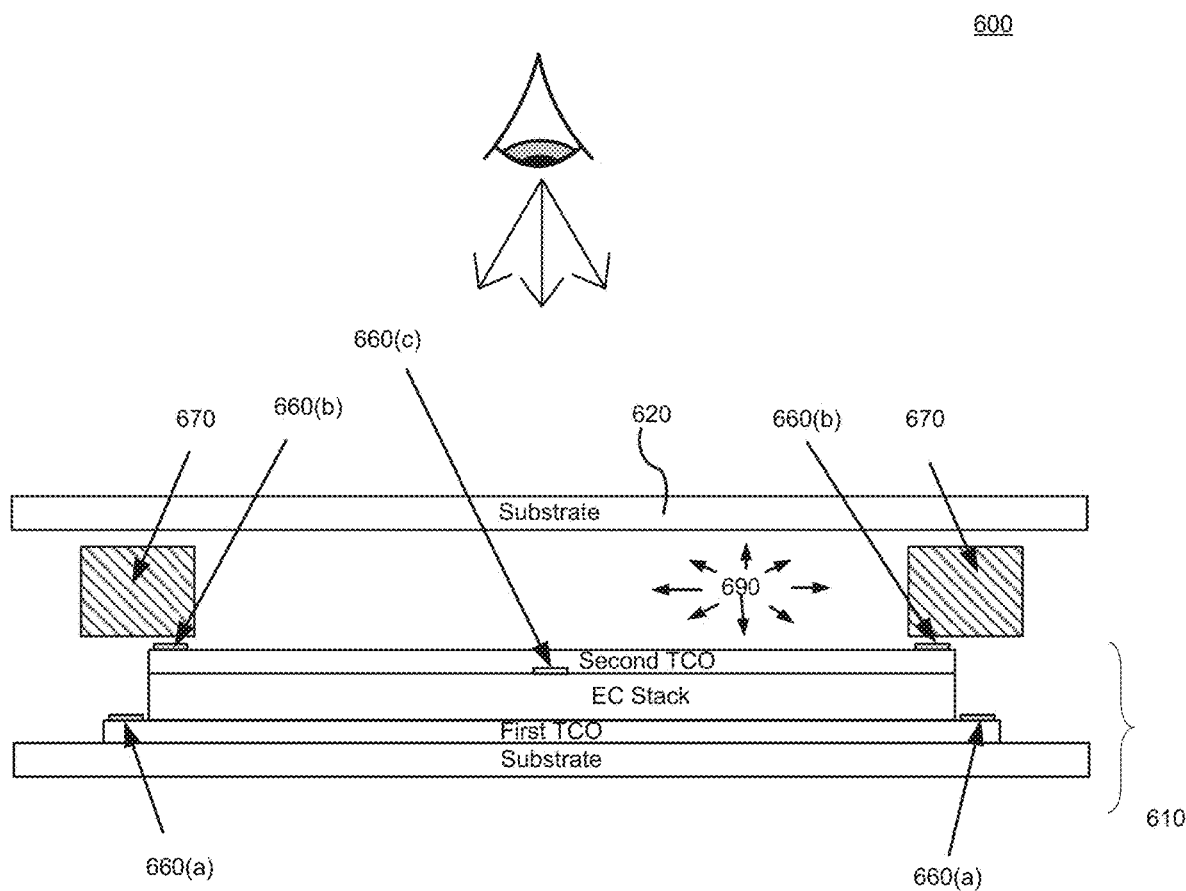
FIG. 5B is a drawing of a cross-sectional view of an EC IGU comprising an optically unobtrusive bus bar within the viewable region, according to an embodiment.
Figure 5C:
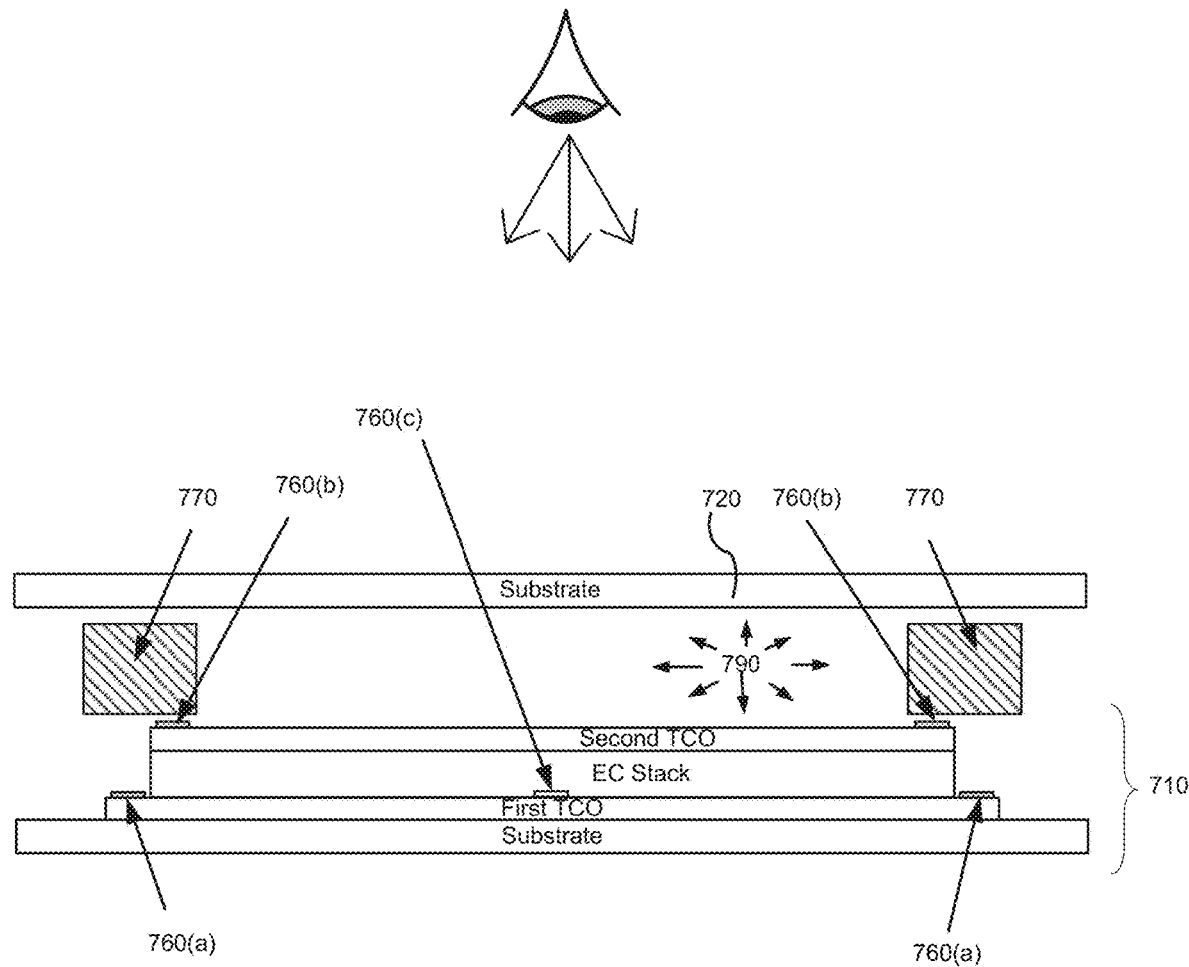
FIG. 5C is a drawing of a cross-sectional view of an EC IGU comprising an optically unobtrusive bus bar within a viewable region, according to an embodiment.
Figure 5D:
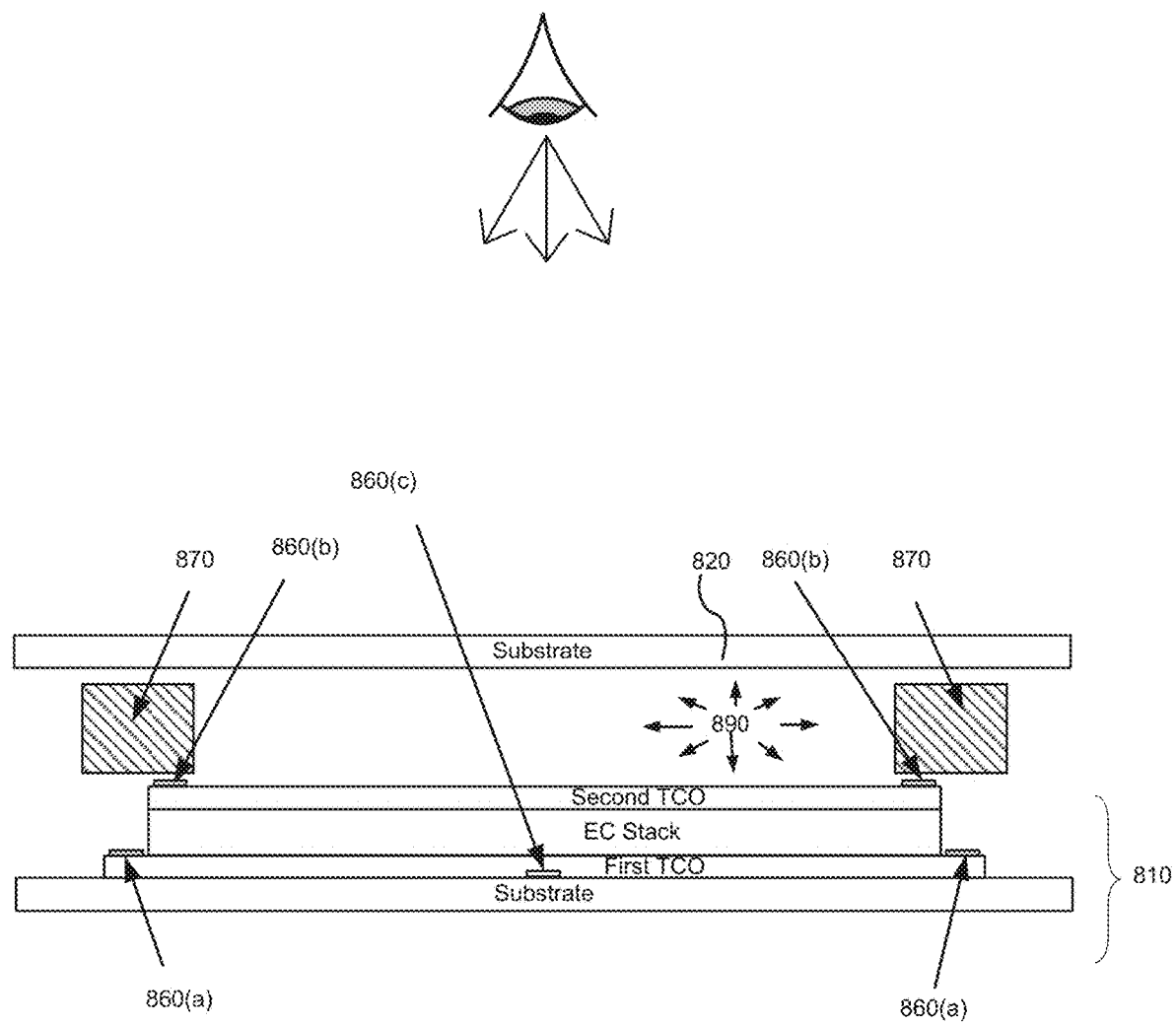
FIG. 5D is a drawing of a cross-sectional view of an EC IGU comprising an optically unobtrusive bus bar within a viewable region, according to an embodiment.
Figure 6A:
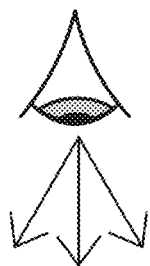
FIG. 6A is a drawing of a cross-sectional view of an EC IGU comprising an optically unobtrusive bus bar) within a viewable region, according to an embodiment.
Figure 6A:
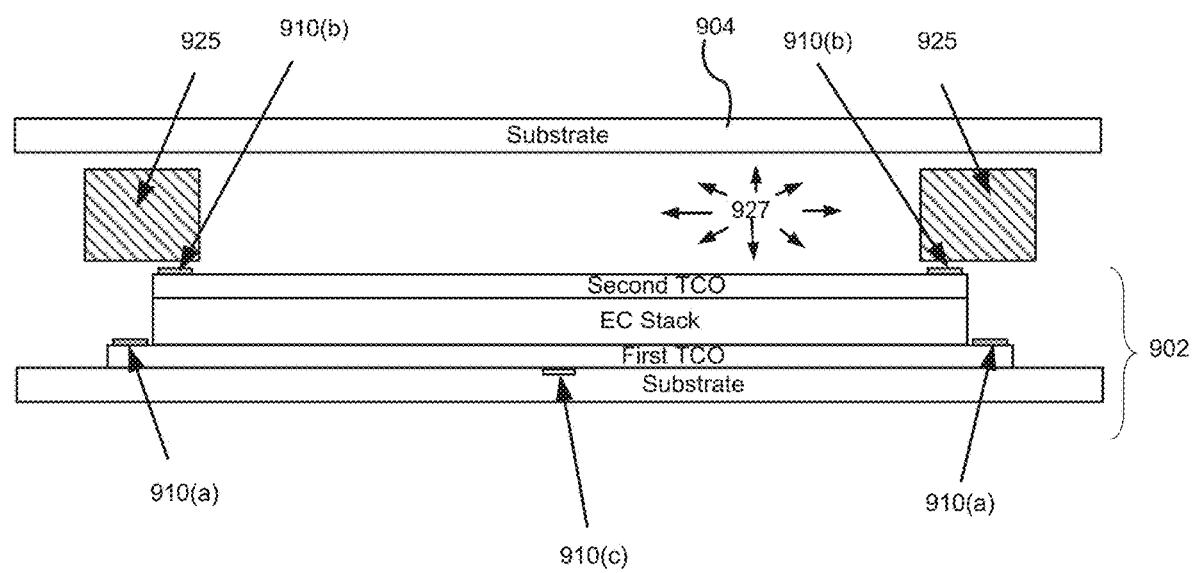
Figure 6B:
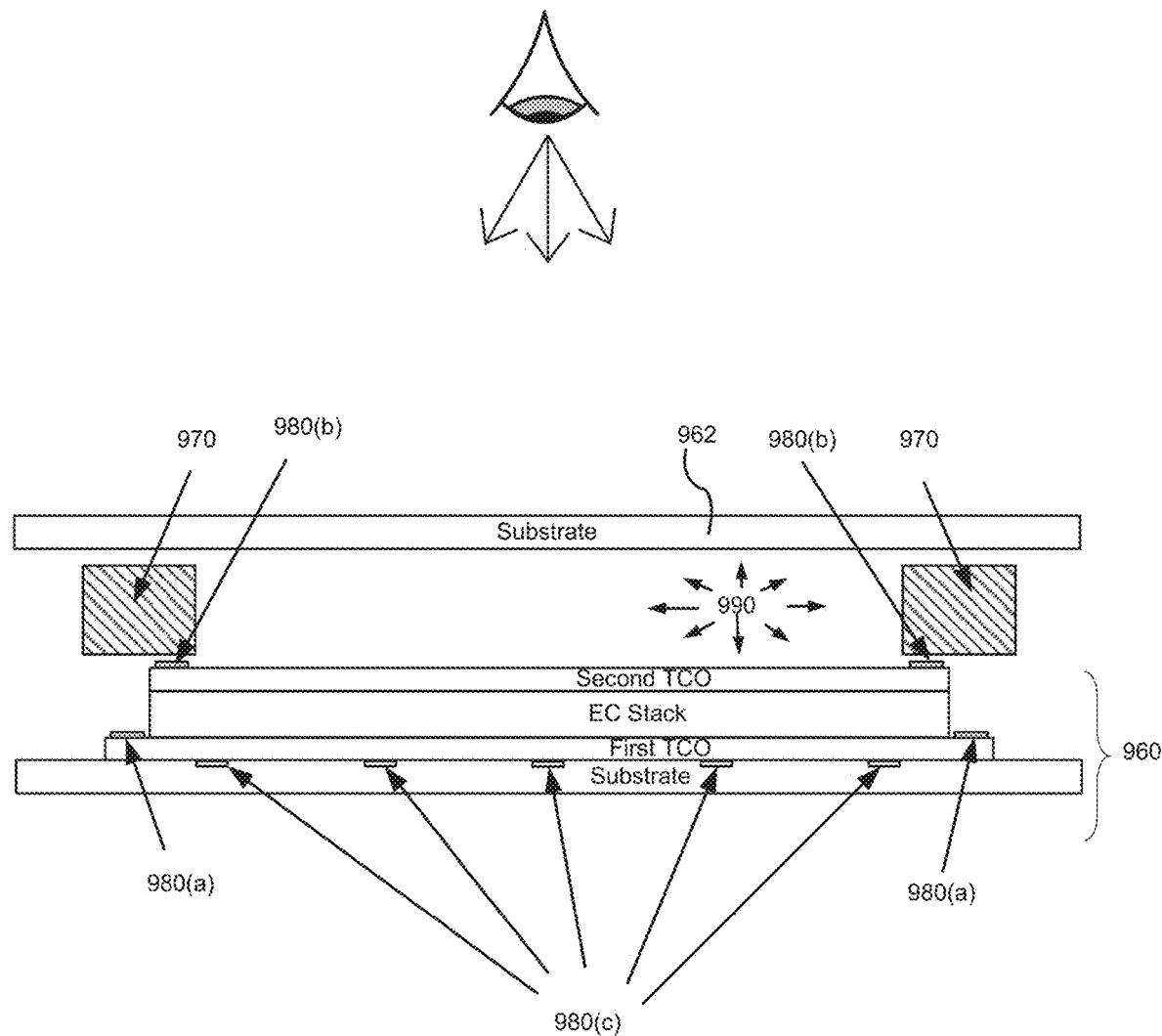
FIG. 6B is a drawing of a cross-sectional view of an EC IGU comprising an optically unobtrusive bus bar within a viewable region, according to an embodiment

In certain embodiments, the optically unobtrusive bus bars may be fabricated onto the surface (e.g., bus bar 860(*c*) shown in FIG. 5D) of a substrate or embedded into the substrate (e.g., bus bar 910(*c*) shown in FIG. 6A and bus bar 930(*c*) shown in FIG. 6B) in some cases. For example, the optically unobstrusive bus bars may be fabricated onto the substantially transparent substrate by patterning material such as, for example, by rolling lithography. In another example, the optically unobstrusive bus bars may be embedded into the substrate by first grinding or otherwise fabricating trenches into the substrate, filling the trenches with the bus bar material, and then planarizing the substrate before depositing the EC device layers. In this example, distortion of the EC device layers may be avoided.

FIG. 5A is a drawing of a cross-sectional view of an EC IGU, 500, comprising an optically unobtrusive bus bar 560(*c*) within a viewable region, according to an embodiment. FIG. 5A also includes an observer viewing the IGU (as depicted with the stylized eye) from, for example, the inside of a building. This is a not-to-scale, partially exploded view showing certain components of the fabricated assembly of the IGU 500 separated. In FIG. 5A, a spacer, 570, is used to separate an EC pane (lite), 510, from a non-EC pane 520.

The first EC pane 510 comprises a first TCO, an EC stack, and second TCO, fabricated on a first substantially transparent substrate, such as a glass substrate. The second pane 520 is a non-EC pane that is a substantially transparent substrate. In other examples, the second pane 520 can have an EC device thereon and/or one or more coatings such as low-E coatings and the like. Although not shown, between spacer 570 and, in this example, the first substrate of first EC pane is a primary seal. This primary seal is also between spacer 570 and the second non-EC pane 520. Around the outer perimeter of spacer 570, and between the substrates, is fabricated a secondary seal (not shown). These seals aid in keeping moisture out of the interior space, 590, of the IGU 500.

In FIG. 5A, the EC IGU 500 comprises a transparent or substantially transparent or otherwise optically unobtrusive bus bar 560(c) fabricated on the second TCO of the first EC pane 510 in the viewable area of the IGU 500 between the spacers 570. The EC IGU 500 further comprises two bus bars 560(a) fabricated on the first TCO of the first EC pane 510 and two bus bars 560(b) (which are optional) fabricated on the second TCO outside the generally viewable area of the IGU 500. Bus bars 560(a) and 560(b) are blocked by the spacer 570 from view by an observer from the viewpoint of the stylized eye. In this example, the bus bars 560(a) and/or 560(b) are made of or coated by a material that blends in optically with the background of the spacer 570 so that an observer from the opposite side (e.g., outside the building) cannot discern the bus bars 560(a) and 560(b). In other cases, the bus bars 560(a) and/or 560(b) may be transparent or substantially transparent or otherwise optically unobtrusive. That is, bus bars 560(a) would be discernable from the viewpoint of an observer from the opposite side unless bus bars 560(a) blend into the background of the spacer 570 or are optically unobtrusive. Also, bus bars 560(b) would be discernable from the opposite side if the EC device is in the un-tinted state and may be discernable if the EC device is in the tinted state unless bus bars 560(a) blend into the background of the spacer 570 or are optically unobtrusive. Although a single optically unobtrusive bus bar 560(c) is shown in the illustrated example, additional bus bars 560(c) may be fabricated on the first TCO, the EC stack, the second TCO, and/or onto/into the substrate in other examples. One embodiment, for example, is an EC device coating with multiple bus bars on the second TCO (upper), e.g. EC device 510b. The bus bars may be substantially transparent, e.g. made of metal, or other transparent materials described herein. In one embodiment, the EC device has, e.g. two bus bars on the bottom TCO, e.g. configured as depicted in FIG. 5A, that is, under the spacer. In other embodiments the bottom TCO has a bus bar on each side of the bottom TCO, e.g. four bus bars or two L-shaped bus bars. In one embodiment, the top TCO has two L-shaped bus bars, substantially transparent, while the bottom TCO has bus bars configured as described in the previous two sentences.

FIG. 5B is a drawing of a cross-sectional top view of an EC IGU, 600, comprising an optically unobtrusive bus bar 660(c) within a viewable region, according to an embodiment. FIG. 5B also includes an observer viewing the IGU from, for example, the inside of a building. This is a not-to-scale, partially exploded view showing certain components of the fabricated assembly of the IGU separated. In FIG. 5B, a spacer, 670, is used to separate an EC pane (lite), 610, from a non-EC pane 620. The first EC pane 610 comprises a first TCO, an EC stack, and second TCO, fabricated on a first substantially transparent substrate, such as a glass substrate. The second pane 620 is a non-EC pane that is a substantially transparent substrate. In other examples, the second pane 620 can have an EC device thereon and/or one or more coatings such as low-E coatings and the like. Although not shown, between spacer 670 and, in this example, the first substrate of first EC pane is a primary seal. This primary seal is also between spacer 670 and the second non-EC pane 620. Around the perimeter of spacer 670 is a secondary seal. These seals aid in keeping moisture out of the interior space, 690, of the IGU 600.

In FIG. 5B, the EC IGU 600 comprises a transparent or substantially transparent or otherwise optically unobtrusive bus bar 660(c) fabricated on the EC stack of the first EC pane 610 in the viewable area of the IGU 600 between the spacers 670. The EC IGU 600 further comprises two bus bars 660(a) fabricated on the first TCO of the first EC pane 610 and two bus bars 660(b) (which are optional) fabricated on the second TCO outside the generally viewable area of the IGU 500. In other cases, the two bus bars 660(b) may be fabricated on the EC stack of the first EC pane 610. In the illustrated example, bus bars 660(a) and 660(b) are blocked by the spacer 670 from view by an observer from the viewpoint of the stylized eye. In this example, the bus bars 660(a) and/or 660(b) are made of or coated by a material that blends in optically with the background of the spacer 670 so that an observer from the opposite side (e.g., outside the building) cannot discern the bus bars 660(a) and 660(b). In other cases, the bus bars 660(a) and/or 660(b) may be transparent or substantially transparent or otherwise optically unobtrusive. That is, bus bars 660(a) would be discernable from the viewpoint of an observer from the opposite side unless bus bars 660(a) blend into the background of the spacer 670 or are optically unobtrusive. Also, bus bars 660(b) would be discernable from the opposite side if the EC device is in the un-tinted state and may be discernable if the EC device is in the tinted state unless bus bars 660(a) blend into the background of the spacer 670 or are optically unobtrusive. Although a single optically unobtrusive bus bar 660(c) is shown in the illustrated example, additional optically unobtrusive bus bars 660(c) may be fabricated on the first TCO, the EC stack, the second TCO, and/or onto/into the substrate in other examples.

FIG. 5C is a drawing of a cross-sectional top view of an EC IGU, 700, comprising an optically unobtrusive bus bar 760(c) within a viewable region, according to an embodiment. FIG. 5C also includes an observer viewing the IGU from, for example, the inside of a building. This is a not-to-scale, partially exploded view showing certain components of the fabricated assembly of the IGU separated. In FIG. 5C, a spacer, 770, is used to separate an EC pane (lite), 710, from a non-EC pane 720. The first EC pane 710 comprises a first TCO, an EC stack, and second TCO, fabricated on a first substantially transparent substrate, such as a glass substrate. The second pane 720 is a non-EC pane that is a substantially transparent substrate. In other examples, the second pane 720 can have an EC device thereon and/or one or more coatings such as low-E coatings and the like. Although not shown, between spacer 770 and, in this example, the first substrate of first EC pane is a primary seal. This primary seal is also between spacer 770 and the second non-EC pane 720. Around the perimeter of spacer 770 is a secondary seal. These seals aid in keeping moisture out of the interior space, 790, of the IGU 700.

In FIG. 5C, the EC IGU 700 comprises a transparent or substantially transparent or otherwise optically unobtrusive bus bar 760(c) fabricated on the first TCO of the first EC pane 710 in the viewable area of the IGU 700 between the spacers 770. The EC IGU 700 further comprises two bus bars 760(a) fabricated on the first TCO of the first EC pane 710 and two bus bars 760(b) fabricated on the second TCO outside the generally viewable area of the IGU 700. In the illustrated example, bus bars 760(a) and 760(b) are blocked by the spacer 770 from view by an observer from the viewpoint of the stylized eye. In this example, the bus bars 760(a) and/or 760(b) are made of or coated by a material that blends in optically with the background of the spacer 770 so that an observer from the opposite side (e.g., outside the building) cannot discern the bus bars 760(a) and 760(b). In other cases, the bus bars 760(a) and/or 760(b) may be transparent or substantially transparent or otherwise optically unobtrusive. That is, bus bars 760(a) would be discernable from the viewpoint of an observer from the opposite side unless bus bars 760(a) blend into the background of the spacer 770 or are optically unobtrusive. Also, bus bars 760(b) would be discernable from the opposite side if the EC device is in the un-tinted state and may be discernable if the EC device is in the tinted state unless bus bars 760(a) blend into the background of the spacer 770 or are optically unobtrusive. Although a single optically unobtrusive bus bar 760(c) is shown in the illustrated example, additional bus bars 760(c) may be fabricated on the first TCO, the EC stack, the second TCO, and/or onto/into the substrate in other examples.

FIG. 5D is a drawing of a cross-sectional top view of an EC IGU, 800, comprising an optically unobtrusive bus bar 860(c) within a viewable region, according to an embodiment. FIG. 5D also includes an observer viewing the IGU from, for example, the inside of a building. This is a not-to-scale, partially exploded view showing certain components of the fabricated assembly of the IGU separated. In FIG. 5D, a spacer, 870, is used to separate an EC pane (lite), 810, from a non-EC pane 820. The first EC pane 810 comprises a first TCO, an EC stack, and second TCO, fabricated on a first substantially transparent substrate, such as a glass substrate. The second pane 820 is a non-EC pane that is a substantially transparent substrate. In other examples, the second pane 820 can have an EC device thereon and/or one or more coatings such as low-E coatings and the like. Although not shown, between spacer 870 and, in this example, the first substrate of first EC pane is a primary seal. This primary seal is also between spacer 870 and the second non-EC pane 820. Around the perimeter of spacer 870 is a secondary seal. These seals aid in keeping moisture out of the interior space, 890, of the IGU 800.

In FIG. 5D, the EC IGU 800 comprises a transparent or substantially transparent or otherwise optically unobtrusive bus bar 860(c) fabricated on the surface of the substrate of the first EC pane 810 in the viewable area of the IGU 800 between the spacers 870. For example, the transparent or otherwise optically unobtrusive bus bar 860(c) may be patterned on the substrate with, for example, rolling lithography. The EC IGU 800 further comprises two bus bars 860(a) fabricated on the first TCO of the first EC pane 810 and two bus bars 860(b) fabricated on the second TCO outside the generally viewable area of the IGU 800. In other cases, the two bus bars 860(b) may be fabricated on the substrate of the first EC pane 810. In the illustrated example, bus bars 860(a) and 860(b) are blocked by the spacer 870 from view by an observer from the viewpoint of the stylized eye. In this example, the bus bars 860(a) and/or 860(b) are made of or coated by a material that blends in optically with the background of the spacer 870 so that an observer from the opposite side (e.g., outside the building) cannot discern the bus bars 860(a) and 860(b). In other cases, the bus bars 860(a) and/or 860(b) may be optically unobtrusive. That is, bus bars 860(a) would be discernable from the viewpoint of an observer from the opposite side unless bus bars 860(a) blend into the background of the spacer 870 or are optically unobtrusive. Also, bus bars 860(b) would be discernable from the opposite side if the EC device is in the un-tinted state and may be discernable if the EC device is in the tinted state unless bus bars 860(a) blend into the background of the spacer 870 or are optically unobtrusive. Although a single optically unobtrusive bus bar 860(c) is shown in the illustrated example, additional bus bars 860(c) may be fabricated on the first TCO, the EC stack, the second TCO, and/or onto/into the substrate in other examples.

In some cases such as the illustrated examples shown in FIGS. 6A and 6B, one or more transparent or substantially transparent or otherwise optically unobtrusive bus bars may be embedded in the substrate of an EC pane in the viewable area of an EC window. For example, the optically unobtrusive bus bars may be embedded into the substrate by first grinding or otherwise fabricating trenches into the substrate, filling the trenches with the bus bar material, and then planarizing the substrate before depositing the EC device layers. FIG. 6A illustrates an example with a single optically unobtrusive bus bar embedded in the substrate of an EC pane. FIG. 6B illustrates an example with multiple optically unobtrusive bus bars embedded in the substrate of an EC pane.

FIG. 6A is a drawing of a cross-sectional top view of an EC IGU, 900, comprising an optically unobtrusive bus bar 910(c) within a viewable region, according to an embodiment. FIG. 6A also includes an observer viewing the IGU from, for example, the inside of a building. This is a not-to-scale, partially exploded view showing certain components of the fabricated assembly of the IGU separated. In FIG. 6A, a spacer, 925, is used to separate an EC pane (lite), 902, from a non-EC pane 904. The first EC pane 902 comprises a first TCO, an EC stack, and second TCO, fabricated on a first substantially transparent substrate, such as a glass substrate. The second pane 904 is a non-EC pane that is a substantially transparent substrate. In other examples, the second pane 904 can have an EC device thereon and/or one or more coatings such as low-E coatings and the like. Although not shown, a primary seal may lie between the spacer 925 and the substrate of the first EC pane 902 and also between the spacer 925 and the second non-EC pane 904. Although not shown, a second seal lies around the perimeter of the spacer 925. These seals aid in keeping moisture out of the interior space, 927, of the IGU 900.

In FIG. 6A, the EC IGU 900 comprises a transparent or substantially transparent or otherwise optically unobtrusive bus bar 910(c) embedded in the substrate of the first EC pane 902 in the viewable area of the IGU 900 between the spacers 925. In this example, distortion of the EC device layers may be avoided. The EC IGU 900 further comprises two bus bars 910(a) fabricated on the first TCO of the first EC pane 902 and two bus bars 910(b) fabricated on the second TCO outside the generally viewable area of the IGU 800. In other cases, the two bus bars 910(b) may also be embedded in the substrate of the first EC pane 902. In the illustrated example, bus bars 910(a) and 910(b) are blocked by the spacer 925 from view by an observer from the viewpoint of the stylized eye. In the illustrated example, the bus bars 910(a) and/or 910(b) are made of or coated by a material that blends in optically with the background of the spacer 870 so that an observer from the opposite side (e.g., outside the building) cannot discern the bus bars 910(a) and 910(b). In other cases, the bus bars 910(a) and/or 910(b) may be optically unobtrusive. That is, bus bars 910(a) would be discernable from the viewpoint of an observer from the opposite side unless bus bars 910(a) blend into the background of the spacer 870 or are optically unobtrusive. Also, bus bars 910(b) would be discernable from the opposite side if the EC device is in the un-tinted state and may be discernable if the EC device is in the tinted state unless bus bars 910(a) blend into the background of the spacer 870 or are optically unobtrusive.

FIG. 6B is a drawing of a cross-sectional top view of an EC IGU, 950, comprising an optically unobtrusive bus bar 980(c) within a viewable region, according to an embodiment. FIG. 6B also includes an observer viewing the IGU 950 from, for example, the inside of a building. This is a not-to-scale, partially exploded view showing certain components of the fabricated assembly of the IGU separated. In FIG. 6B, a spacer, 970, is used to separate an EC pane (lite), 960, from a non-EC pane 962. The first EC pane 960 comprises a first TCO, an EC stack, and second TCO, fabricated on a first substantially transparent substrate, such as a glass substrate. The second pane 962 is a non-EC pane that is a substantially transparent substrate. In other examples, the second pane 962 can have an EC device thereon and/or one or more coatings such as low-E coatings and the like. Although not shown, a primary seal may lie between the spacer 970 and the substrate of the first EC pane 960 and also between the spacer 970 and the second non-EC pane 962. Although not shown, a second seal lies around the perimeter of the spacer 970. These seals aid in keeping moisture out of the interior space, 990, of the IGU 950.

In FIG. 6B, the EC IGU 950 comprises five (5) optically unobtrusive bus bar 980(c) embedded in the substrate of the first EC pane 902 in the viewable area of the IGU 950 between the spacers 970. Although five (5) optically unobtrusive bus bars 980(c) are shown in the illustrated example, other numbers may be used. The EC IGU 950 further comprises two bus bars 980(a) fabricated on the first TCO of the first EC pane 960 and two bus bars 980(b) fabricated on the second TCO outside the generally viewable area of the IGU 950. In other cases, the two bus bars 980(b) may also be embedded in the substrate of the first EC pane 960. In the illustrated example, bus bars 980(a) and 980(b) are blocked by the spacer 970 from view by an observer from the viewpoint of the stylized eye. In the illustrated example, the bus bars 980(a) and/or 980(b) are made of or coated by a material that blends in optically with the background of the spacer 970 so that an observer from the opposite side (e.g., outside the building) cannot discern the bus bars 980(a) and 980(b). In other cases, the bus bars 980(a) and/or 980(b) may be transparent or substantially transparent or otherwise optically unobtrusive. That is, bus bars 980(a) would be discernable from the viewpoint of an observer from the opposite side unless bus bars 980(a) blend into the background of the spacer 970 or are optically unobtrusive. Also, bus bars 980(b) would be discernable from the opposite side if the EC device is in the un-tinted state and may be discernable if the EC device is in the tinted state unless bus bars 980(a) blend into the background of the spacer 970 or are optically unobtrusive.

In one embodiment, an EC device has multiple transparent bus bars embedded in the substrate and also multiple transparent bus bars on the top TCO, as depicted in FIG. 5A (bottom). This configuration allows more even and faster tinting of the EC device stack. The bus bars on the top and bottom of the device structure may be parallel or not. Advantages to having non-parallel bus bars, e.g., is wiring of the bus bar ends for each TCO can be done on orthogonal sides. The number of transparent bus bars on the top and or bottom of the EC device as described herein can be one, two, three, four, five or more; depending on the size of the substrate the conductivity of the bus bar material used, the conductivity of the TCO to which the bus bars are electrically communicating with, switching speed desired, etc.

D. Matching Resistive Properties of Conductor Layers Using Bus Bars.

Typically conductor layers in an EC device are designed to match resistively to each other. In some cases, these conductor layers may not match, for example, the top and bottom TCOs may have substantially different electrical conductivity. For example the bottom TCO may have a low resistivity, e.g. <5 ohms/sq, while the top TCO might have a resistivity of greater than 10 ohms/sq. In these cases, the material of the bus bar may be selected to compensate for the resistive properties and to match the resistive properties of the conductive layers. For example, as depicted in the bottom portion of FIG. 5A, a series of transparent bus bars may be fabricated on the top TCO to compensate for this resistivity difference, i.e. allow more voltage to be applied across the top TCO and therefore compensate for its lower resistivity than the bottom TCO. In fact, this is one desirable construct; i.e. where a top TCO is purposefully fabricated with a higher resistivity than the bottom TCO, in anticipation of further fabricating multiple transparent bus bars thereon (so as not to have a final device structure that would otherwise have a resistivity mismatch where the top TCO has a net lower resistivity than the bottom TCO due to added conducting bus bars on the top TCO).

F. Bus Bars Residing Under Spacer

Some conventional IGUs have a bus bar on the inner surface of an EC lite that traverses the primary seal (between the spacer and the EC pane). That is, this bus bar is located on this inner surface running primarily within the inner perimeter of the spacer and exits through the primary seal under the spacer to connect to a power line outside the outer perimeter of the spacer. In these IGUs, the EC coating does not lie outside the inner perimeter of the spacer i.e. under the spacer. Typically, these conventional IGUs also have scribe lines in the EC coating within this inner perimeter of the spacer.

Traversing the primary seal with the bus bar can create a possible leak path through the seal along a weak seal between the bus bar and the primary seal. Some conventional systems use a coating applied over the bus bar to keep the IGU sealed from leaking gas from the sealed space within the IGU. These conventional IGUs use blocking material to prevent viewers from seeing the bus bars from both sides of the IGU from within the inner perimeter of the spacer. These IGUs use a laminated outer lite to sandwich the blocking material between a support substrate and an inner substrate having the EC device on the opposite surface from the blocking material. This block material in the laminated lite must also block the scribe lines from viewers as well. From one side of the IGU, a blocking layer is used to prevent view of the bus bars and scribe lines. From the other side, material is applied over the bus bar to blend in with the background material in the laminated lite. This blocking material takes up valuable area within the inner perimeter of the spacer that would otherwise be viewable area. Embodiments described herein differ in that they do not occupy viewable area by design (if they do it is de minimus).

In certain aspects, bus bars of EC glass structures described herein reside almost entirely under the spacer. In these cases, the bus bar does not pass through the inner diameter and avoids creating a leak path in the seal that could potentially allow gas within the sealed volume of the IGU to leak out. Since these bus bars reside under the spacer (e.g., embedded in the seal or the EC coating), the spacer itself blocks the bus bars from being viewed from one side. In this case, only a single direction of view of the bus bars from the other side must be obscured. In this direction, the bus bars have the primary seal of the spacer in the background. Since only the view outside of the inner perimeter of the spacer needs to be blocked from view, much of the area within the inner perimeter of the spacer is available as viewable area.

In certain aspects, an obscuration layer is located at the same interface as the EC coating, where the interface is between an inner IGU substrate and the spacer. The obscuration layer is only required to block the view of the bus bar from the single direction since it lies under the spacer and cannot be seen through the opposite side through the spacer.

In certain aspects, the obscuration layer does not reside within the inner perimeter of the spacer. The obscuration layer is only blocking from view the embedded bus bar with the spacer in the background. As discussed above, the bus bar does not reside within the inner perimeter of the spacer and thus, there would be no reason to place an obscuration layer within the inner perimeter. Furthermore, the obscuration layer the obscuration layer need only be the width of the bus bar or about the width of the bus bar to block the view of the bus bar. For example, ink or other materials may be applied to an area that does not exceed the spacer's inner perimeter.

Figure 7:
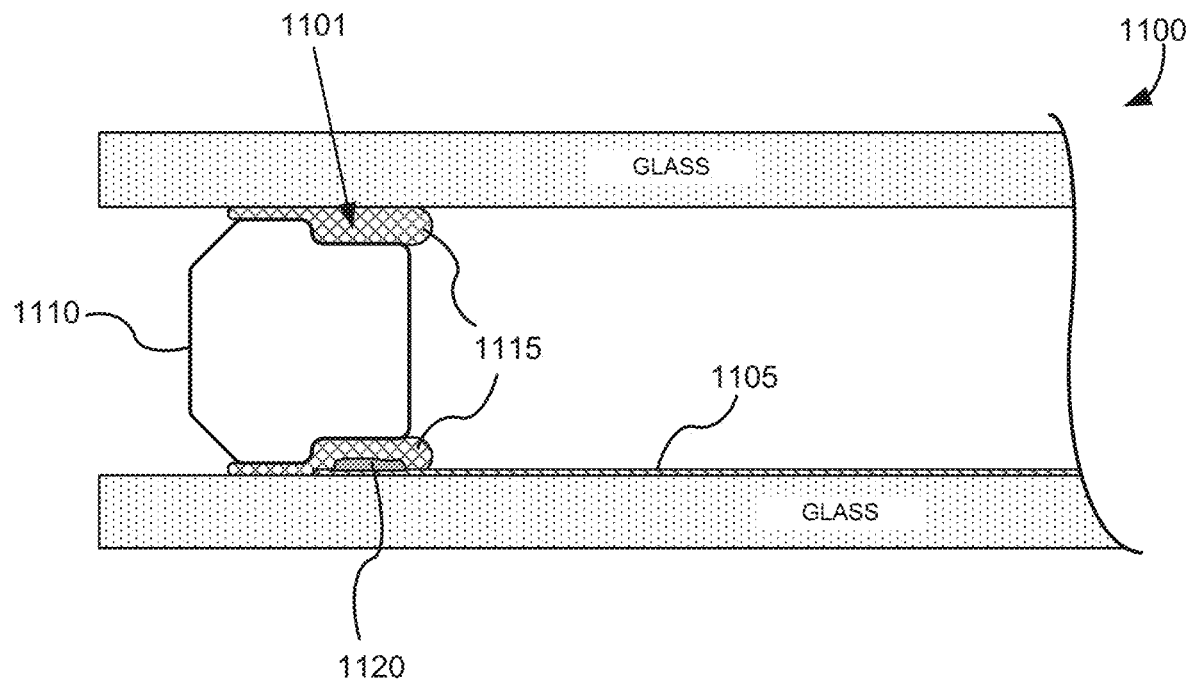
FIG. 7 is a drawing of a cross section of an edge region of an IGU comprising a spacer residing under a spacer, according to an embodiment.

Examples of bus bars residing under spacers can be found in U.S. patent application Ser. No. 14/152,873 titled "SPACERS FRO INSULATED GLASS UNITS," and filed on Jul. 10, 2014, which is hereby incorporated by reference in its entirety. FIG. 7 shows an example of a cross section, 1100, of an edge region of an IGU where the spacer 1110 of the IGU and a bus bar 1120 reside. In the illustration, the bus bar 1120 resides under the spacer 1110. As illustrated, a spacer, 1110, is sandwiched between two sheets of glass near the edge of the IGU. In a typical design, the glass interfaces directly with a primary seal material, 1115, (e.g., a thin elastomeric layer, such as PIB or PVB), which is in direct contact with spacer 1110. In some embodiments, spacer 1110 may be metal spacer, such as a steel spacer or a stainless steel spacer, for example. This three-part interface (i.e., glass/primary seal material/spacer) exists on both a top piece of glass and a bottom piece of glass. Spacer 1110 may have a hollow structure, as depicted in FIG. 7. In some embodiments, the spacer may have a substantially rectangular cross section. At a minimum, spacers described herein have at least two surfaces, each substantially parallel to the lites of the IGU in which they are to be incorporated. The remaining cross section, e.g., surfaces of the spacer that face the interior space of the IGU and the exterior, secondary seal area, space may have any number of contours, i.e., they need not be flat, but may be. In some embodiments, the top and bottom outer corners of the spacer are beveled and/or rounded to produce a shallower angle in these areas. Rounding, beveling, or smoothing may be included to ensure there are no sharp edges that might enhance electrical shorting. An electrochromic device stack, 1105, is fabricated on the lower glass lite, as depicted. A bus bar, 1120, is located on electrochromic device stack 1105 in order to make electrical contact with one of the electrodes of the device. In this example, bus bar 1120 is between spacer 1110 and the lower glass lite. This is accomplished by configuring one of the aforementioned surfaces below (see top surface of spacer 1110) or above (see bottom surface of spacer 1110) the other surface on the face of the spacer that forms the primary seal with the glass surface. This configuration of surfaces forms "notch" 1101; see further description below. Primary seal material 1115 serves as an insulating layer between bus bar 1120 and spacer 1110. Spacer embodiments with notches may help to accommodate added vertical thickness, e.g. due to obscuration layers.

There are two primary distinctions between a typical spacer design and spacer 1110 shown in FIG. 7. First, spacer 1110 is relatively thicker (wider) in the direction parallel to the glass sheet (i.e., a larger footprint). A conventional metal spacer is approximately 6 millimeters in width. Spacer 1110 is about two times to about two and one half times (about 2× to about 2.5×) that width. For example, spacer 1110 may be about 10 millimeters to about 15 millimeters wide, about 13 millimeters to about 17 millimeters wide, or about 11 millimeters wide. This additional width may provide a greater margin of error in a sealing operation compared to a conventional spacer.

The second significant distinction of spacer 1110 from a conventional spacer is in the use of recesses or notches 1101 on the upper and lower inner corners of spacer 1110. In some embodiments, a spacer may include two notches, and in some embodiments, the spacer may include one notch. Two notches, e.g., as depicted in FIG. 7, may be used for an IGU containing two electrochromic lites, or may be useful in fabricating IGUs with only one electrochromic light. When using a spacer with two notches in an IGU containing one electrochromic lite, there is no need for special placement of a single notch toward the electrochromic lite. In some embodiments, a recess or notch may extend from a corner of one side of the rectangular cross section of the spacer to a point along the one side of the rectangular cross section of the spacer. At least one notch provides an area for covering the bus bar formed on the glass surface and/or covering the bus bar formed on electrochromic device stack 505 formed on the glass surface. In some embodiments, the bus bar is about 2 millimeters to about 3 millimeters in width and about 0.01 millimeters to about 0.1 millimeter in height (thickness). The bus bar length depends on the window size. In some embodiments, a bus bar may have a length about the length of the electrochromic device. The added width, along with the "notched" profile of spacer 1110 that accommodates the bus bar, creates a region of "encapsulation" whereby the bus bar is unlikely to contact the spacer at any point along the length of the bus bar, but is encapsulated in the primary sealant.

In some embodiments, the portion of the spacer's face that does not include the notch (i.e., the outer portion of the spacer) is approximately the same width as a normal spacer employed in non-electrochromic IGU applications. As depicted in FIG. 7, bus bar 1120 is entirely covered by the spacer 1110. As a consequence, the bus bar is not visible to a user of the window.

In FIG. 7, electrochromic device stack 1105 extends underneath bus bar 1120 and partially into the region formed by notch 1101 in spacer 1110. As noted above, an electrochromic device stack typically includes a conductive electrode layer such as ITO or TEC. Electrochromic device stack 1105 may be entirely removed from the edge of the glass surface by an edge deletion process, described above. However, the removal by edge deletion may not extend entirely up to the edge of the bus bar, as this would be unacceptable given normal process tolerances. Therefore, electrochromic device stack 1105 may extend just slightly beyond bus bar 1120, e.g., while still residing in notch 1101.

Figure 8:
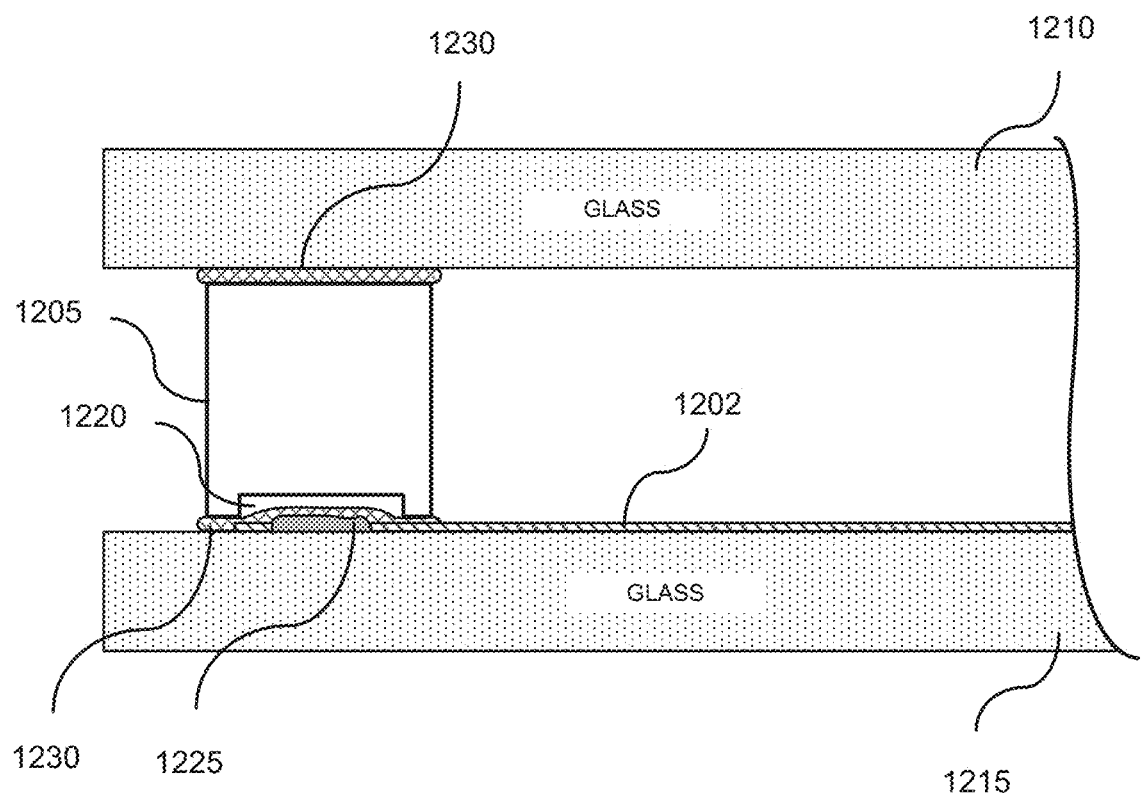
FIG. 8 is a drawing of a cross-sectional of a spacer which has a notch on the bottom to accommodate the full length of a bus bar, according to an embodiment.

FIG. 8 shows an example of a cross-sectional illustration of a spacer which has a notch on the bottom to accommodate the full length of an embedded bus bar. As shown in FIG. 8, a spacer, 1205, is between two glass lites, 1210 and 1215. In some embodiments, spacer 1205 may be a metal spacer, such as a steel spacer or a stainless steel spacer, for example. In some embodiments, spacer 1205 may have a substantially rectangular cross section. In some embodiments, spacer 1205 may be hollow. Spacer 1205 includes a notch or recess, 1220, to accommodate a bus bar, 1225. Notch or recess 1220 may form a channel that accommodates the length of bus bar 1225. Notch 1220 should be distinguished from a channel or a "mouse hole" in the spacer which may accommodate a bus bar lead. An electrochromic device stack, 1202, is fabricated on glass lite 815. Bus bar 1225 located on electrochromic device stack 1202 makes electrical contact with one of the electrodes of electrochromic device stack 1202.

Notch 1220 in spacer 1205 resides in the middle of the underside of spacer 1205. The dimensions of notch 1220 are suitable to accommodate bus bar 1225, factoring in tolerances of the process used to form the notch, as discussed above. In some embodiments, the notch width is about 2 millimeters to about 5 millimeters, and the notch height is about 0.1 millimeters to 1 millimeter. In some embodiments, the notch width is about 3 millimeters to 4 millimeters, and the notch height is about 0.1 millimeter to about 0.5 millimeters.

Comparing notch 1220 shown in FIG. 8 to notch 1101 shown in FIG. 7, notch 1220 is in the middle of the underside of the spacer and notch 1101 is at the interior edge of the underside of the spacer. In other regards, however, the embodiment shown in FIG. 8 may be similar to the embodiment shown in FIG. 7. For example, many of the dimensions and other design features described with respect to FIG. 7 may apply equally to FIG. 8. Spacer 1205 may be relatively thicker (wider) in the direction parallel to the glass sheet compared to conventional metal spacers. A conventional metal spacer is approximately 6 millimeters in width. Spacer 1205 is about two times to about two and one half times (about 2× to about 2.5×) that width. For example, spacer 1205 may be about 10 millimeters to about 15 millimeters, about 13 millimeters to about 17 millimeters, or about 11 millimeters wide. This additional width may provide a greater margin of error in a sealing operation compared to a conventional spacer. In some embodiments, the bus bar is about 2 millimeters to about 3 millimeters in width and about 0.01 millimeters to about 0.1 millimeter in height (thickness). The bus bar length depends on the window size. In some embodiments, a bus bar may have a length about the length of the electrochromic device. The basic IGU primary seal is comprised of interfaces between glass lites 1210 and 1215 and primary seal material (e.g., PIB), 1230, and between primary seal material 1230 and spacer 1205.

In some embodiments, the channel for the bus bar lead is located, but need only penetrate part way under the spacer because the bus bar resides midway underneath the spacer. In some embodiments, the bus bar lead channel resides on an outside edge of the spacer or on an outside edge of a corner of the spacer.

In some embodiments, the electrochromic device stack 1202 when in a colored state may color all the way under the spacer such that electrochromic device stack 1202 is substantially uniformly colored. Further, the bus bar may not be visible.

g. Combining Obscuring Techniques

In certain embodiments, a combination of the above-described obscuring techniques may be employed in a single EC glass structure. In the illustrated example shown in FIG. 1A for example, bus bar 1 160(*a*) may be an optically unobtrusive bus bar and an obscuring layer may be used under bus bar 2 160(*b*). In this example, both bus bars will not be visible in the untinted state since bus bar 1 is transparent and bus bar 2 is blocked from view by the obscuring layer. In the tinted state, bus bar 2 will continue to be blocked from view.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. An insulated glass unit, comprising:
   a first substantially transparent substrate and a second substantially transparent substrate;
   a spacer between the first and second substantially transparent substrates;
   a primary seal between the spacer and the first substantially transparent substrate and between the spacer and the second substantially transparent substrate;
   an electrochromic device disposed on at least one of the first and second substantially transparent substrates; and
   a bus bar in electrical communication with the electrochromic device, the bus bar comprising an electrically conductive material with one or more tinting agents configured to approximate color and/or luminescence of a background to the bus bar, wherein the bus bar is located in the primary seal.

2. The insulated glass unit of claim 1, wherein the one or more tinting agents are configured for a contrast in luminescence and/or color between the bus bar and the background that is within a predefined range.

3. The insulated glass unit of claim 1, wherein the background is from a vantage point of an observer outside the insulated glass unit.

4. The insulated glass unit of claim 1, wherein the one or more tinting agents comprise carbon black, graphite, and/or graphene.

5. The insulated glass unit of claim 1, wherein the bus bar comprises one or more of carbon black, graphite, a graphite-based material, graphene, and a graphene-based material.

6. The insulated glass unit of claim 1, wherein the electrically conductive material of the bus bar comprises a metallic ink with the one or more tinting agents.

7. The insulated glass unit of claim 1, wherein the electrically conductive material of the bus bar comprises a silver ink with the one or more tinting agents comprising carbon black, graphite, and/or graphene.

8. The insulated glass unit of claim 1, wherein the primary seal comprises an elastomeric material.

9. The insulated glass unit of claim 8, wherein the elastomeric material is polyisobutylene (PIB) or polyvinyl butyral (PVB).

10. The insulated glass unit of claim 1, wherein the primary seal comprises a tinting agent.

11. The insulated glass unit of claim 1, wherein the bus bar is located between the spacer and the first and second substantially transparent substrates.

12. The insulated glass unit of claim 1, wherein the background of the bus bar comprises the spacer and/or the primary seal.

13. The insulated glass unit of claim 12, wherein the spacer comprises a metal material with an electrically insulating coating.

14. The insulated glass unit of claim 12, wherein the spacer comprises a metal material or a polymeric material.

15. The insulated glass unit of claim 12, wherein the spacer comprises a steel material.

16. The insulated glass unit of claim 1, wherein the background of the bus bar comprises a metal material or a polymeric material.

17. An insulated glass unit, comprising:
- a first substantially transparent substrate and a second substantially transparent substrate;
- a spacer between the first and second substantially transparent substrates;
- a primary seal between the spacer and the first substantially transparent substrate and between the spacer and the second substantially transparent substrate;
- an electrochromic device disposed on at least one of the first and second substantially transparent substrates; and
- a bus bar in electrical communication with the electrochromic device, the bus bar comprising an electrically conductive material with one or more materials having a color similar to a background of the bus bar, wherein the bus bar is located in the primary seal.

18. The insulated glass unit of claim 17, wherein the background is from a vantage point of an observer outside the insulated glass unit.

19. The insulated glass unit of claim 17, wherein the one or more materials comprises one or more of carbon black, graphite, a graphite-based material, graphene, and a graphene-based material.

20. The insulated glass unit of claim 17, wherein the electrically conductive material of the bus bar comprises a metallic ink with one or more tinting agents.

21. The insulated glass unit of claim 17, wherein the electrically conductive material of the bus bar comprises a silver ink with one or more tinting agents comprising carbon black, graphite, and/or graphene.

22. The insulated glass unit of claim 17, wherein the primary seal comprises an elastomeric material.

23. The insulated glass unit of claim 22, wherein the elastomeric material is polyisobutylene (PIB) or polyvinyl butyral (PVB).

24. The insulated glass unit of claim 17, wherein the primary seal comprises a tinting agent.

25. The insulated glass unit of claim 17, wherein the bus bar is located between the spacer and the first and second substantially transparent substrates.

26. The insulated glass unit of claim 17, wherein the background of the bus bar comprises the spacer and/or the primary seal.

27. The insulated glass unit of claim 26, wherein the spacer comprises a metal material with an electrically insulating coating.

28. The insulated glass unit of claim 26, wherein the spacer comprises a metal material or a polymeric material.

29. The insulated glass unit of claim 26, wherein the spacer comprises a steel material.

30. The insulated glass unit of claim 26, wherein the background of the bus bar comprises a metal material or a polymeric material.

* * * * *